United States Patent
Kuang

(10) Patent No.: US 10,348,635 B2
(45) Date of Patent: Jul. 9, 2019

(54) DATA TRANSMISSION METHOD AND DEVICE

(71) Applicant: Huawei Technologies Co., Ltd., Shenzhen (CN)

(72) Inventor: Yunsheng Kuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/534,388

(22) PCT Filed: Dec. 8, 2014

(86) PCT No.: PCT/CN2014/093313
§ 371 (c)(1),
(2) Date: Jun. 8, 2017

(87) PCT Pub. No.: WO2016/090539
PCT Pub. Date: Jun. 16, 2016

(65) Prior Publication Data
US 2018/0083884 A1    Mar. 22, 2018

(51) Int. Cl.
*H04L 12/865*     (2013.01)
*H04L 12/851*     (2013.01)
(Continued)

(52) U.S. Cl.
CPC .......... *H04L 47/6275* (2013.01); *H04L 47/24* (2013.01); *H04L 47/2466* (2013.01);
(Continued)

(58) Field of Classification Search
None
See application file for complete search history.

(56) References Cited

U.S. PATENT DOCUMENTS 6,798,743 B1 * 9/2004 Ma .................. H04L 47/10
370/235
8,705,427 B1   4/2014 Chhabra et al.
(Continued)

FOREIGN PATENT DOCUMENTS

CN    1551653 A    12/2004
CN    101043438 A    9/2007
(Continued)

OTHER PUBLICATIONS

Zhu, J., et al., "An Efficient QoS-Constrained Data Aggregation and Processing Approach in Distributed Wireless Sensor Networks," XP010938055, IEEE Computer Society, Jun. 26, 2006, 6 pages.
(Continued)

*Primary Examiner* — Michael J Moore, Jr.
(74) *Attorney, Agent, or Firm* — Conley Rose, P.C.

(57) ABSTRACT

A data transmission method and a device, where the method includes obtaining a service data packet that needs to be sent to a peer device, determining a priority corresponding to the service data packet, writing the service data packet to a packet buffer when the priority is lower than a preset level, encapsulating the data stored in the packet buffer in order to generate a to-be-sent packet when data stored in the packet buffer meets a transmission condition, and sending the to-be-sent packet to the peer device.

20 Claims, 12 Drawing Sheets

(51) Int. Cl.
*H04L 12/835* (2013.01)
*H04L 12/855* (2013.01)
*H04L 12/861* (2013.01)
*H04L 29/08* (2006.01)
*H04W 28/06* (2009.01)
*H04L 12/841* (2013.01)

(52) U.S. Cl.
CPC .......... *H04L 47/30* (2013.01); *H04L 49/9005* (2013.01); *H04L 67/1074* (2013.01); *H04L 47/245* (2013.01); *H04L 47/286* (2013.01); *H04L 2212/00* (2013.01); *H04W 28/065* (2013.01); *Y02D 70/142* (2018.01); *Y02D 70/144* (2018.01); *Y02D 70/162* (2018.01); *Y02D 70/26* (2018.01)

(56) References Cited

U.S. PATENT DOCUMENTS

| | | | |
|---|---|---|---|
| 2002/0085582 | A1 | 7/2002 | Kim |
| 2004/0223505 | A1 | 11/2004 | Kim et al. |
| 2004/0257995 | A1* | 12/2004 | Sandy .................. H04L 47/10 370/235 |
| 2010/0165872 | A1* | 7/2010 | Jiang ................ H04L 43/0817 370/253 |
| 2012/0188874 | A1* | 7/2012 | Kumagai ........... H04L 47/2441 370/235 |
| 2013/0343398 | A1* | 12/2013 | Sarca .................. H04L 47/32 370/412 |
| 2014/0105218 | A1* | 4/2014 | Anand ............... H04L 47/6255 370/412 |
| 2014/0164640 | A1* | 6/2014 | Ye ........................ H04L 47/12 709/235 |
| 2014/0226663 | A1* | 8/2014 | Chan .................... H04L 45/741 370/392 |

FOREIGN PATENT DOCUMENTS

| | | | |
|---|---|---|---|
| CN | 101047640 A | 10/2007 | |
| CN | 101087245 A | 12/2007 | |
| CN | 101150497 A | 3/2008 | |
| CN | 102025638 A | 4/2011 | |
| CN | 103973802 A | 8/2014 | |
| WO | 9512265 A1 | 5/1995 | |

OTHER PUBLICATIONS

Hong, W., et al.,"A Multichannel Scheduler for High-Speed Wireless Backhaul Links with Packet Concatenation," XP011335435, IEEE Transactions on Mobile Computing, vol. 9, No. 2, Feb. 1, 2010, 14 pages.
"IEEE Standard for a High-Performance Serial Bus—Amendment 2," IEEE Computer Society, IEEE Std 1394b, Dec. 14, 2002, 381 pages.
Foreign Communication From a Counterpart Application, European Application No. 14907839.6, Extended European Search Report dated Nov. 27, 2017, 6 pages.
Machine Translation and Abstract of Chinese Publication No. CN101087245, Dec. 12, 2007, 8 pages.
Machine Translation and Abstract of Chinese Publication No. CN101150497, Mar. 26, 2008, 8 pages.
Foreign Communication From a Counterpart Application, PCT Application No. PCT/CN2014/093313, English Translation of International Search Report dated Sep. 11, 2015, 2 pages.
Foreign Communication From a Counterpart Application, PCT Application No. PCT/CN2014/093313, English Translation of Written Opinion dated Sep. 11, 2015, 6 pages.
Machine Translation and Abstract of Chinese Publication No. CN101043438, dated Sep. 26, 2007, 18 pages.
Machine Translation and Abstract of Chinese Publication No. CN101047640, dated Oct. 3, 2007, 10 pages.
Machine Translation and Abstract of Chinese Publication No. CN102025638, dated Apr. 20, 2011, 16 pages.
Machine Translation and Abstract of Chinese Publication No. CN103973802, dated Aug. 6, 2014, 7 pages.
Jeong, J., et al., "A QoS-Aware Data Aggregation in Wireless Sensor Networks," The 12th International Conference on Advanced Communication Technology (ICACT), Feb. 7-10, 2010, 6 pages.
Foreign Communication From a Counterpart Application, Chinese Application No. 201480083889.2, Chinese Office Action dated Apr. 15, 2019, 7 pages.

* cited by examiner

DATA TRANSMISSION METHOD AND DEVICE

CROSS-REFERENCE TO RELATED APPLICATION

This application is a U.S. National Stage of International Patent Application No. PCT/CN2014/093313 filed on Dec. 8, 2014, which is hereby incorporated by reference in its entirety.

TECHNICAL FIELD

The present disclosure relates to the field of communications technologies, and in particular, to a data transmission method and a device.

BACKGROUND

The Core Specification Working Group (CSWG) in the BLUETOOTH Special Interest Group (BLUETOOTHBT SIG) formulates a specification named "LE Data Length Extension". In the specification, a maximum payload length of a BLUETOOTH low energy (BLE) packet is extended from original 31 octets to 255 octets. This newly added feature will be released in a BLUETOOTH version 4.2.

In the General Attribute Protocol (GATT) defined in the BLE protocol, devices in a BLE network include two types, a sensor (for example, a wearable device) and a collector (for example, a smartphone). The sensor is a data provider (Server), and the collector is a data receiver (Client). The sensor directly adds the service data packet to a payload of a to-be-transmitted packet, and sends the BLE packet to the collector when the sensor needs to transmit a service data packet of a particular service to the collector. Existing wireless transmission processes are all similar to that, and are not listed one by one herein. As can be seen, in an existing transmission method, a payload of each transmitted packet carries only one service data packet. However, an amount of data in a single service data packet is generally only several octets or ten-odd octets, and is far less than a maximum payload length that can be carried by the packet, for example, 255 octets. Therefore, data transmission efficiency is low, power consumption of transmission is high, and an advantage of the maximum payload length in the packet is completely not used.

SUMMARY

Embodiments of the present disclosure provide a data transmission method and a device in order to improve data transmission efficiency and reduce power consumption of transmission.

According to a first aspect, an embodiment of the present disclosure provides a data transmission method, including obtaining a service data packet that needs to be sent to a peer device and determining a priority corresponding to the service data packet, writing the service data packet to a packet buffer if the priority is lower than a preset level, encapsulating the data stored in the packet buffer in order to generate a to-be-sent packet when data stored in the packet buffer meets a transmission condition, and sending the to-be-sent packet to the peer device.

With reference to the first aspect, in a first possible implementation manner of the first aspect, the transmission condition includes data that has been stored in the packet buffer reaches or exceeds a threshold, where the threshold is set according to a maximum payload length that can be carried by the to-be-sent packet, or a preset length of time elapses after the first service data packet is written to the packet buffer, where the preset length of time is set according to a maximum transmission latency allowed by the service data packet.

With reference to the first aspect or the first possible implementation manner of the first aspect, in a second possible implementation manner of the first aspect, the method further includes encapsulating the service data packet in order to generate a to-be-sent packet if the priority is higher than or equal to the preset level, and sending the to-be-sent packet to the peer device, or detecting whether there is data stored in the packet buffer if the priority is higher than or equal to the preset level, writing the service data packet to the packet buffer if data has been stored in the packet buffer, and encapsulating data stored in the packet buffer in order to generate a to-be-sent packet, and sending the to-be-sent packet to the peer device.

With reference to the first aspect, in a third possible implementation manner of the first aspect, before writing the service data packet to a packet buffer, the method further includes obtaining a length of the service data packet, and determining, according to the length of the service data packet and a maximum payload length that can be carried by a to-be-sent packet, whether the service data packet can be written to the packet buffer, and writing the service data packet to a packet buffer includes writing the service data packet to the packet buffer when the service data packet can be written to the packet buffer.

With reference to the third possible implementation manner of the first aspect, in a fourth possible implementation manner of the first aspect, determining, according to the length of the service data packet and a maximum payload length that can be carried by a to-be-sent packet, whether the service data packet can be written to the packet buffer includes comparing the length of the service data packet with a data amount of idle space of the packet buffer when the maximum payload length that can be carried by a to-be-sent packet is greater than a maximum data buffering amount of the packet buffer, and determining that the service data packet can be written to the packet buffer if the length of the service data packet is less than or equal to the data amount of the idle space of the packet buffer, or determining that the service data packet cannot be written to the packet buffer if the length of the service data packet is greater than the data amount of the idle space of the packet buffer.

With reference to the third possible implementation manner of the first aspect, in a fifth possible implementation manner of the first aspect, determining, according to the length of the service data packet and a maximum payload length that can be carried by a to-be-sent packet, whether the service data packet can be written to the packet buffer includes calculating a sum of the length of the service data packet and an amount already occupied by data in the packet buffer when the maximum payload length that can be carried by a to-be-sent packet is less than or equal to a maximum data buffering amount of the packet buffer, and determining that the service data packet can be written to the packet buffer if a calculation result is less than or equal to the maximum payload length that can be carried by a to-be-sent packet, or determining that the service data packet cannot be written to the packet buffer if a calculation result is greater than the maximum payload length that can be carried by a to-be-sent packet.

With reference to the first aspect, in a sixth possible implementation manner of the first aspect, after writing the service data packet to a packet buffer, the method further includes writing a preset separator at the end or beginning of the service data packet.

With reference to the first aspect, in a seventh possible implementation manner of the first aspect, after the sending the to-be-sent packet to the peer device, the method further includes clearing the packet buffer.

With reference to the first aspect, in an eighth possible implementation manner of the first aspect, obtaining a service data packet that needs to be sent to a peer device includes obtaining, using a sensor, sensor data that needs to be sent to the peer device, and converting the sensor data into a service data packet in a particular format, where the particular format is a data structure that can be identified by the peer device.

With reference to the first aspect, in a ninth possible implementation manner of the first aspect, obtaining a service data packet that needs to be sent to a peer device includes obtaining, using a processor, service information that needs to be sent to the peer device, and converting the service information into a service data packet in a particular format, where the particular format is a data structure that can be identified by the peer device.

With reference to the first aspect or any possible implementation manner of the first aspect above, in a tenth possible implementation manner of the first aspect, determining a priority corresponding to the service data packet includes determining a target service corresponding to the service data packet, and determining, according to a correspondence between a service type and a priority, a priority of the target service as the priority corresponding to the service data packet.

With reference to the tenth possible implementation manner of the first aspect, in an eleventh possible implementation manner of the first aspect, the method further includes receiving a priority control instruction sent by the peer device, where the priority control instruction carries service identification information and a priority, and updating the correspondence between a service type and a priority according to the service identification information and the priority, and/or receiving status information sent by the peer device, and updating the correspondence between a service type and a priority according to the status information.

According to a second aspect, an embodiment of the present disclosure provides a device, including a first obtaining module configured to obtain a service data packet that needs to be sent to a peer device, a first determining module configured to determine a priority corresponding to the service data packet, a write module configured to write the service data packet to a packet buffer if the priority is lower than a preset level, an encapsulation module configured to encapsulate the data stored in the packet buffer in order to generate a to-be-sent packet when data stored in the packet buffer meets a transmission condition, and a sending module configured to send the to-be-sent packet to the peer device.

With reference to the second aspect, in a first possible implementation manner of the second aspect, the transmission condition includes data that has been stored in the packet buffer reaches or exceeds a threshold, where the threshold is set according to a maximum payload length that can be carried by the to-be-sent packet, or a preset length of time elapses after the first service data packet is written to the packet buffer, where the preset length of time is set according to a maximum transmission latency allowed by the service data packet.

With reference to the second aspect or the first possible implementation manner of the second aspect, in a second possible implementation manner of the second aspect, the encapsulation module is further configured to encapsulate the service data packet in order to generate a to-be-sent packet if the priority is higher than or equal to the preset level, and the sending module is further configured to send the to-be-sent packet to the peer device, or the device further includes a detection module configured to detect whether there is data stored in the packet buffer if the priority is higher than or equal to the preset level. The encapsulation module is further configured to write the service data packet to the packet buffer, and encapsulate data stored in the packet buffer in order to generate a to-be-sent packet if data has been stored in the packet buffer, and the sending module is further configured to send the to-be-sent packet to the peer device.

With reference to the second aspect, in a third possible implementation manner of the second aspect, the device further includes a second obtaining module configured to obtain a length of the service data packet, and a second determining module configured to determine, according to the length of the service data packet and a maximum payload length that can be carried by a to-be-sent packet, whether the service data packet can be written to the packet buffer, and the write module is further configured to write the service data packet to the packet buffer when the service data packet can be written to the packet buffer.

With reference to the third possible implementation manner of the second aspect, in a fourth possible implementation manner of the second aspect, the second determining module is further configured to compare the length of the service data packet with a data amount of idle space of the packet buffer when the maximum payload length that can be carried by a to-be-sent packet is greater than a maximum data buffering amount of the packet buffer, determine that the service data packet can be written to the packet buffer if the length of the service data packet is less than or equal to the data amount of the idle space of the packet buffer, and determine that the service data packet cannot be written to the packet buffer if the length of the service data packet is greater than the data amount of the idle space of the packet buffer.

With reference to the third possible implementation manner of the second aspect, in a fifth possible implementation manner of the second aspect, the second determining module is further configured to calculate a sum of the length of the service data packet and an amount already occupied by data in the packet buffer when the maximum payload length that can be carried by a to-be-sent packet is less than or equal to a maximum data buffering amount of the packet buffer, determine that the service data packet can be written to the packet buffer if a calculation result is less than or equal to the maximum payload length that can be carried by a to-be-sent packet, and determine that the service data packet cannot be written to the packet buffer if a calculation result is greater than the maximum payload length that can be carried by a to-be-sent packet.

With reference to the second aspect, in a sixth possible implementation manner of the second aspect, the write module is further configured to write a preset separator at the end or beginning of the service data packet after writing the service data packet to the packet buffer.

With reference to the second aspect, in a seventh possible implementation manner of the second aspect, the device further includes a clearing module configured to clear the packet buffer.

With reference to the second aspect, in an eighth possible implementation manner of the second aspect, the first obtaining module is further configured to obtain, using a sensor, sensor data that needs to be sent to the peer device, and convert the sensor data into a service data packet in a particular format, where the particular format is a data structure that can be identified by the peer device.

With reference to the second aspect, in a ninth possible implementation manner of the second aspect, the first obtaining module is further configured to obtain, using a processor, service information that needs to be sent to the peer device, and convert the service information into a service data packet in a particular format, where the particular format is a data structure that can be identified by the peer device.

With reference to the second aspect or any possible implementation manner of the second aspect above, in a tenth possible implementation manner of the second aspect, the first determining module is further configured to determine a target service corresponding to the service data packet, and determine, according to a correspondence between a service type and a priority, a priority of the target service as the priority corresponding to the service data packet.

With reference to the tenth possible implementation manner of the second aspect, in an eleventh possible implementation manner of the second aspect, the device further includes an update module configured to receive a priority control instruction sent by the peer device, where the priority control instruction carries service identification information and a priority, and update the correspondence between a service type and a priority according to the service identification information and the priority, and/or receive status information sent by the peer device, and update the correspondence between a service type and a priority according to the status information.

According to a third aspect, an embodiment of the present disclosure provides a device, including a memory and a processor, where the memory stores a set of program code, and the processor is configured to invoke the program code stored in the memory, to execute the following operations of obtaining a service data packet that needs to be sent to a peer device and determining a priority corresponding to the service data packet, writing the service data packet to a packet buffer if the priority is lower than a preset level, encapsulating the data stored in the packet buffer in order to generate a to-be-sent packet when data stored in the packet buffer meets a transmission condition, and sending the to-be-sent packet to the peer device.

With reference to the third aspect, in a first possible implementation manner of the third aspect, the transmission condition includes data that has been stored in the packet buffer reaches or exceeds a threshold, where the threshold is set according to a maximum payload length that can be carried by the to-be-sent packet, or a preset length of time elapses after the first service data packet is written to the packet buffer, where the preset length of time is set according to a maximum transmission latency allowed by the service data packet.

With reference to the third aspect or the first possible implementation manner of the third aspect, in a second possible implementation manner of the third aspect, the processor further executes the following operations of encapsulating the service data packet in order to generate a to-be-sent packet if the priority is higher than or equal to the preset level, and sending the to-be-sent packet to the peer device, or detecting whether there is data stored in the packet buffer if the priority is higher than or equal to the preset level, writing the service data packet to the packet buffer, and encapsulating data stored in the packet buffer in order to generate a to-be-sent packet if data has been stored in the packet buffer, and sending the to-be-sent packet to the peer device.

With reference to the third aspect, in a third possible implementation manner of the third aspect, before the processor executes the operation of writing the service data packet to a packet buffer, the processor further executes the following operations of obtaining a length of the service data packet, and determining, according to the length of the service data packet and a maximum payload length that can be carried by a to-be-sent packet, whether the service data packet can be written to the packet buffer, and the writing the service data packet to a packet buffer includes writing the service data packet to the packet buffer when determining that the service data packet can be written to the packet buffer.

With reference to the third possible implementation manner of the third aspect, in a fourth possible implementation manner of the third aspect, executing, by the processor, the operation of determining, according to the length of the service data packet and a maximum payload length that can be carried by a to-be-sent packet, whether the service data packet can be written to the packet buffer includes executing the following operations of comparing the length of the service data packet with a data amount of idle space of the packet buffer when the maximum payload length that can be carried by a to-be-sent packet is greater than a maximum data buffering amount of the packet buffer, and determining that the service data packet can be written to the packet buffer if the length of the service data packet is less than or equal to the data amount of the idle space of the packet buffer, or determining that the service data packet cannot be written to the packet buffer if the length of the service data packet is greater than the data amount of the idle space of the packet buffer.

With reference to the third possible implementation manner of the third aspect, in a fifth possible implementation manner of the third aspect, executing, by the processor, the operation of determining, according to the length of the service data packet and a maximum payload length that can be carried by a to-be-sent packet, whether the service data packet can be written to the packet buffer further includes executing the following operations of calculating a sum of the length of the service data packet and an amount already occupied by data in the packet buffer when the maximum payload length that can be carried by a to-be-sent packet is less than or equal to a maximum data buffering amount of the packet buffer, and determining that the service data packet can be written to the packet buffer if a calculation result is less than or equal to the maximum payload length that can be carried by a to-be-sent packet, or determining that the service data packet cannot be written to the packet buffer if a calculation result is greater than the maximum payload length that can be carried by a to-be-sent packet.

With reference to the third aspect, in a sixth possible implementation manner of the third aspect, after the processor executes the operation of writing the service data packet to a packet buffer, the processor further executes the following operation of writing a preset separator at the end or beginning of the service data packet.

With reference to the third aspect, in a seventh possible implementation manner of the third aspect, after the processor executes the operation of sending the to-be-sent packet to the peer device, the processor further executes the following operation of clearing the packet buffer.

With reference to the third aspect, in an eighth possible implementation manner of the third aspect, executing, by the processor, the operation of obtaining a service data packet that needs to be sent to a peer device further includes executing the following operations of obtaining, using a sensor, sensor data that needs to be sent to the peer device, and converting the sensor data into a service data packet in a particular format, where the particular format is a data structure that can be identified by the peer device.

With reference to the third aspect, in a ninth possible implementation manner of the third aspect, executing, by the processor, the operation of obtaining a service data packet that needs to be sent to a peer device includes executing the following operations of obtaining, using a processor, service information that needs to be sent to the peer device, and converting the service information into a service data packet in a particular format, where the particular format is a data structure that can be identified by the peer device.

With reference to the third aspect or any possible implementation manner of the third aspect above, in a tenth possible implementation manner of the third aspect, executing, by the processor, the operation of determining a priority corresponding to the service data packet includes executing the following operations of determining a target service corresponding to the service data packet, and determining, according to a correspondence between a service type and a priority, a priority of the target service as the priority corresponding to the service data packet.

With reference to the tenth possible implementation manner of the third aspect, in an eleventh possible implementation manner of the third aspect, the processor further executes the following operations of receiving a priority control instruction sent by the peer device, where the priority control instruction carries service identification information and a priority, and updating the correspondence between a service type and a priority according to the service identification information and the priority, and/or receiving status information sent by the peer device, and updating the correspondence between a service type and a priority according to the status information.

During implementation of the embodiments of the present disclosure, a priority corresponding to a service data packet is determined when the service data packet that needs to be sent to a peer device is obtained, the to-be-sent service data packet is written to a packet buffer if the priority is lower than a preset level, the data stored in the packet buffer is encapsulated in order to generate a to-be-sent packet when data stored in the packet buffer meets a transmission condition, and the generated to-be-sent packet is sent to the peer device. By means of the embodiments of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a data transmission method and a device. A local device determines a priority corresponding to a service data packet when obtaining the service data packet that needs to be sent to a peer device, writes the to-be-sent service data packet to a packet buffer if the priority is lower than a preset level, encapsulates the data stored in the packet buffer in order to generate a to-be-sent packet when data stored in the packet buffer meets a transmission condition, and sends the generated to-be-sent packet to the peer device. By means of the embodiments of the present disclosure, a manner of sending a to-be-sent service data packet is determined according to a priority corresponding to the service data packet, and a payload in a to-be-sent packet is made close to a maximum payload length of the to-be-sent packet as far as possible if the priority is relatively low, thereby improving data transmission efficiency and reducing power consumption of transmission.

The embodiments of the present disclosure may be applied to a device or system that is based on a wireless or wired transmission manner. The wireless transmission manner may be BLUETOOTH, infrared, WI-FI, ZIGBEE, or the like, and the wired transmission manner may be based on a universal serial bus (USB) data line or the like. A specific transmission manner is not limited in the embodiments of the present disclosure. BLUETOOTH transmission is one of the most common transmission manners. Therefore, for ease of description, the BLUETOOTH transmission is used as an example in some scenarios in the embodiments of the present disclosure. However, it should be noted that, the BLUETOOTH transmission is not intended to limit the protection scope of the present disclosure. For ease of description, in the following embodiments, a data sending party is referred to as a "local device", and a data receiving party is referred to as a "peer device". It should be noted that, the "local device" and the "peer device" are intended only for description. During specific implementation, roles of the "local device" and the "peer device" may be exchanged, that is, the "local device" and the "peer device" both can receive and send data. The data transmission method and the device provided in the embodiments of the present disclosure are separately described below in detail with reference to FIG. 1A to FIG. 9.

Figure 1A:
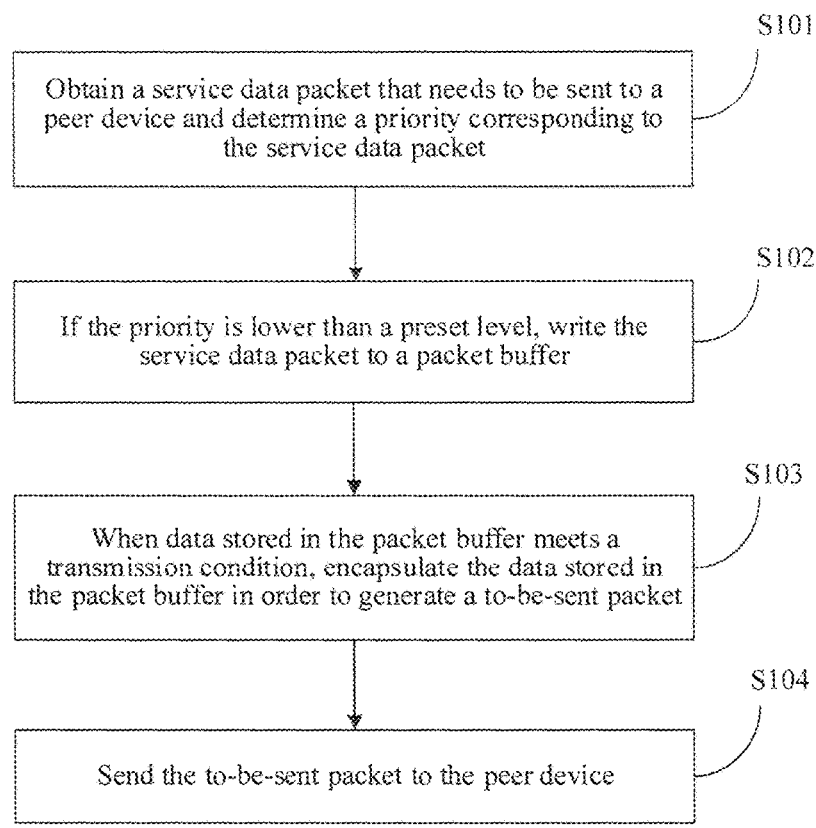
FIG. 1A is a schematic flowchart of a data transmission method according to an embodiment of the present disclosure.

Referring to FIG. 1A, FIG. 1A is a schematic flowchart of a data transmission method according to an embodiment of the present disclosure. In this embodiment of the present disclosure, the method may include the following steps.

Step S101: Obtain a service data packet that needs to be sent to a peer device and determine a priority corresponding to the service data packet.

During specific implementation, when a local device needs to transmit data to a peer device, the local device establishes a communication connection, for example, a BLUETOOTH connection or an infrared connection, to the peer device. A specific connection manner is not limited in this embodiment of the present disclosure. In a wireless transmission manner, data is transmitted in a form of a packet, and to-be-transmitted target data is loaded into a payload of a to-be-transmitted packet.

Figure 1B:
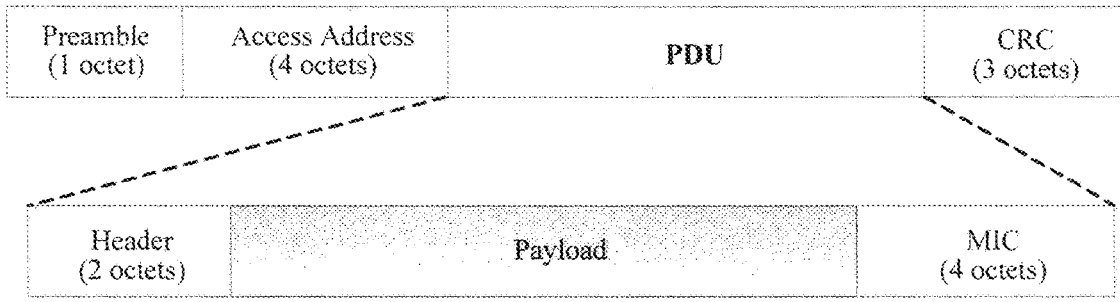
FIG. 1B is a schematic diagram of a frame format of a BLE packet according to FIG. 1A.

Generally, a maximum payload length that can be carried by a packet of each type and a frame format of the packet are stipulated in a related protocol or standard. For ease of understanding, a BLE packet in BLUETOOTH transmission is used as an example. For example, in an existing BLUETOOTH version, a maximum payload length of a BLE packet is 31 octets, and in a to-be-released BLUETOOTH version 4.2, a maximum payload length of a BLE packet is 255 octets. A frame format of a BLE packet is shown in FIG. 1B. Referring to FIG. 1B, FIG. 1B is a schematic diagram of a frame format of a BLE packet according to FIG. 1A. It can be seen from FIG. 1B that, each BLE includes one-octet Preamble, a four-octet Access Address, a PDU (which is protocol data unit), and a three-octet CRC (which is cyclic redundancy check). The PDU includes a two-octet Header, a Payload, and a four-octet MIC (which is message integrity check). Payload length information of the BLE packet is carried in a Header field of the PDU, and the Header field indicates a quantity of octets of the Payload plus an MIC field. For example, if a maximum payload length of the BLE packet is 31 octets, the Payload part can carry a maximum of 27-octet data. If a maximum payload length of the BLE packet is 255 octets, the Payload part can carry a maximum of 251-octet data. It should be noted that, in the foregoing fields, only data information carried in the Payload part is valid data that needs to be transmitted, and information carried in the other fields is all unrelated to information to be transmitted in the packet. Therefore, the information may be considered as "redundant information". It can be known that, one BLE packet has 14-octet "redundant information" in total. In other words, even though the BLE packet does not carry any data, a data amount of the BLE packet is still 14 octets.

Figure 1C:
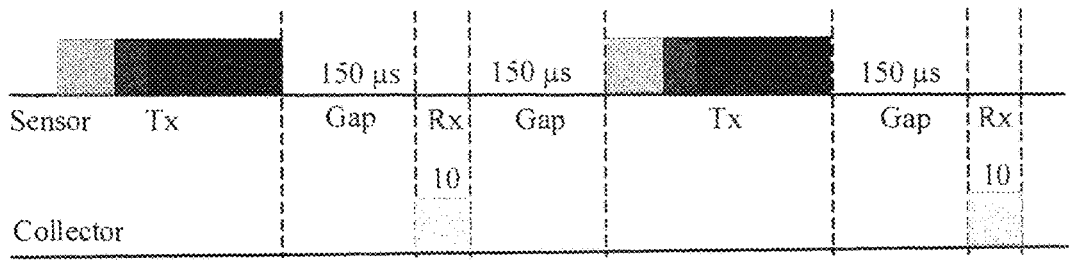
FIG. 1C is a schematic diagram of a manner of BLE network data exchange according to FIG. 1B.

In the GATT defined in the BLE protocol, devices in a BLE network include two types, a sensor and a collector. The sensor is a data provider (Server), and the collector is a data receiver (Client). The sensor collects a to-be-sent service data packet, encapsulates the service data packet into a packet according to the method in the present disclosure, and sends the packet to the collector. After receiving the packet, the collector parses the packet in order to obtain the service data packet carried in the packet. During specific implementation, the collector may also transmit data to the sensor. That is, the Server and the Client are peer devices of each other, and can transmit data to each other. A specific manner is not limited in this embodiment of the present disclosure. In an actual BLE network, a wearable device (for example, a SMARTWATCH, a SMARTBAND, SMARTGLASSES, or other motion and medical monitoring devices) may serve as a sensor, and a mobile electronic device (for example, a smartphone or a tablet computer) may serve as a collector. Data exchange between the sensor and the collector may be shown in FIG. 1C. FIG. 1C is a schematic diagram of a manner of BLE network data exchange according to FIG. 1B. Usually, there is a 150 microseconds (µs) gap (designated as Gap) after the sensor sends a BLE packet to the collector, and within this gap, both of the devices do not send a signal. After the gap expires, the collector sends a 10-octet acknowledgment packet (ACK) to the sensor in order to acknowledge that the collector has accurately received the BLE packet sent from the sensor. The ACK packet does not carry any information data. After the sensor receives the ACK packet, the sensor sends a next BLE packet to the collector after another 150 µs gap expires. The entire process is referred to as a transaction.

Currently, a data transmission rate stipulated in the BLE is 1 megabits per second (Mbps), that is, 1 µs is consumed to transmit one-bit data. It can be known that, when a payload length of a BLE packet is 31 octets, an amount of information data (that is, a payload) transmitted in one transaction is 27 octets, and a length of the entire BLE packet is 41 octets. Therefore, one transaction consumes 708 µs in total, and 27-octet information data is transmitted within the 708 µs. Therefore, 3.28 seconds are consumed in total to transmit 1 megabit (Mbit) information data. A radio frequency working time (a time of the gap is excluded) is 1.89 seconds. Similarly, when a payload length of a BLE packet is 255, an amount of information data transmitted in one transaction is 251 octets, and a length of the entire BLE packet is 265 octets. One transaction consumes 2500 µs in total. Therefore, 1.25 seconds are consumed in total to transmit 1 Mbit information data. A radio frequency working time is 1.10 seconds. It can be seen that, when information data of a same amount is transmitted, the total consumed time of the later is only 38.1% of that of the former, and when same transmit power is applied, power consumption of the later is 58.2% of that of the former. Therefore, it can be known from the foregoing description that, less valid data carried in a single transmitted BLE packet indicates lower data transmission efficiency and higher power consumption of a device in transmission of a data unit. Therefore, increasing a payload length of an actual payload of a to-be-transmitted packet can improve information data transmission efficiency and reduce power consumption of a device in transmission. Correspondingly, based on a principle the same as that of a BLE packet, a packet of another type is similar thereto. That is, a smaller actual payload carried in the packet indicates lower data transmission efficiency and higher power consumption of transmission. Details are not described herein. It can be known from the foregoing description that, in a data transmission process, if more data is carried in a payload of a packet within a bearable range of a maximum payload that can be carried by the packet, data transmission efficiency is higher and power consumption of transmission is lower.

In this embodiment of the present disclosure, it is considered that in an actual processing process, there may be some services or data relatively sensitive about a transmission latency, for example, an alert notification service (ANS) and an immediate alert service (IAS), and some services or data insensitive about a transmission latency, for example, services related to motion and health, such as a heart rate service (HRS) and a blood-pressure service (BLS). For example, for the ANS, once a service data packet of the service is obtained, it indicates that there may be a risk in the local device. Therefore, the information should be notified to the peer device at a fastest speed. It can be known that, a service of such a type has a high transmission latency requirement, and a priority corresponding to the service is also high. For another example, assuming that the HRS and the BLS have low transmission latency requirements, priorities corresponding to the services are also low. During specific implementation, a priority corresponding to each service is preset according to a transmission latency requirement of each service. Therefore, once a service data packet of the service is obtained, a priority corresponding to the service data packet can be determined.

In this embodiment of the present disclosure, after obtaining the service data packet that needs to be sent to the peer device, the local device determines the priority corresponding to the service data packet, and identifies whether the priority is lower than a preset level. If the priority corresponding to the service data packet is lower than the preset level, it indicates that the service data packet has a relatively low transmission latency requirement. Therefore, the local device may wait to obtain more service data packets, and then encapsulate all service data packets into a packet and send the packet to the peer device in order to improve data transmission efficiency. If the priority corresponding to the service data packet is higher than or equal to the preset level, it indicates that the service data packet has a relatively high transmission latency requirement. Therefore, the local device needs to immediately encapsulate the service data packet into a packet and send the packet to the peer device in order to reduce a transmission latency.

Step S102: If the priority is lower than a preset level, write the service data packet to a packet buffer.

In this embodiment of the present disclosure, if the priority corresponding to the obtained service data packet that needs to be sent to the peer device is lower than the preset level, it indicates that the service data packet has a relatively low transmission latency requirement. Therefore, the local device may wait to obtain more service data packets, and then encapsulate all service data packets into a packet for sending. During specific implementation, if a priority corresponding to a to-be-transmitted service data packet is lower than the preset level, the service data packet is written to the packet buffer. The packet buffer is configured to buffer the to-be-transmitted service data packet. When data stored in the packet buffer meets a transmission condition, the data in the packet buffer is encapsulated into a to-be-sent packet such that an actual payload length of the packet is close as far as possible to a maximum payload length that can be carried by the packet, to improve data transmission efficiency.

Step S103: When data stored in the packet buffer meets a transmission condition, encapsulate the data stored in the packet buffer in order to generate a to-be-sent packet.

In this embodiment of the present disclosure, the local device may periodically detect whether data stored in the packet buffer meets the transmission condition, or may detect whether data stored in the packet buffer meets the transmission condition after or before writing a service data packet whose priority is lower than the preset level to the packet buffer. A specific manner is not limited in this embodiment of the present disclosure. If the data stored in the packet buffer meets the transmission condition, the data stored in the packet buffer is encapsulated in order to generate a to-be-sent packet.

In a feasible implementation manner, the transmission condition may be that data that has been stored in the packet buffer reaches or exceeds a threshold, and the threshold is set according to a maximum payload length that can be carried by the to-be-sent packet. In this way, it is ensured that the data stored in the packet buffer does not exceed the maximum payload length that can be carried by the packet, but is close to or reaches the maximum payload length. Therefore, a service data packet whose priority is relatively low is written to the packet buffer such that an actual payload length of a to-be-transmitted packet is close as far as possible to or reaches a maximum payload length that can be carried by the packet in order to improve data transmission efficiency and reduce power consumption of transmission.

In another feasible implementation manner, the transmission condition may be that a preset length of time elapses after the first service data packet is written to the packet buffer, and the preset length of time is set according to a maximum transmission latency allowed by the service data packet. In this way, data transmission efficiency is improved and power consumption of transmission is reduced, and at the same time, a transmission latency requirement of to-be-transmitted data is met.

In another feasible implementation manner, the transmission condition may be that a quantity of service data packets written to the packet buffer reaches a preset quantity, and the preset quantity is set according to a maximum payload length that can be carried by the to-be-sent packet and a length of a service data packet. For example, assuming that the maximum payload length is 255 octets, and the length of a service data packet is 20 octets, the preset quantity may be preset to 12.

Step S104: Send the to-be-sent packet to the peer device.

After the to-be-sent packet is generated in the foregoing step S103, the packet is sent to the peer device such that the peer device parses out a corresponding service data packet from the packet.

In the data transmission method described in this embodiment of the present disclosure, when obtaining a service data packet that needs to be sent to a peer device, a local device determines a priority corresponding to the service data packet, writes the to-be-sent service data packet to a packet buffer if the priority is lower than a preset level, encapsulates the data stored in the packet buffer, to generate a to-be-sent packet when data stored in the packet buffer meets a transmission condition, and sends the generated to-be-sent packet to the peer device. By means of this embodiment of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

Figure 2A:
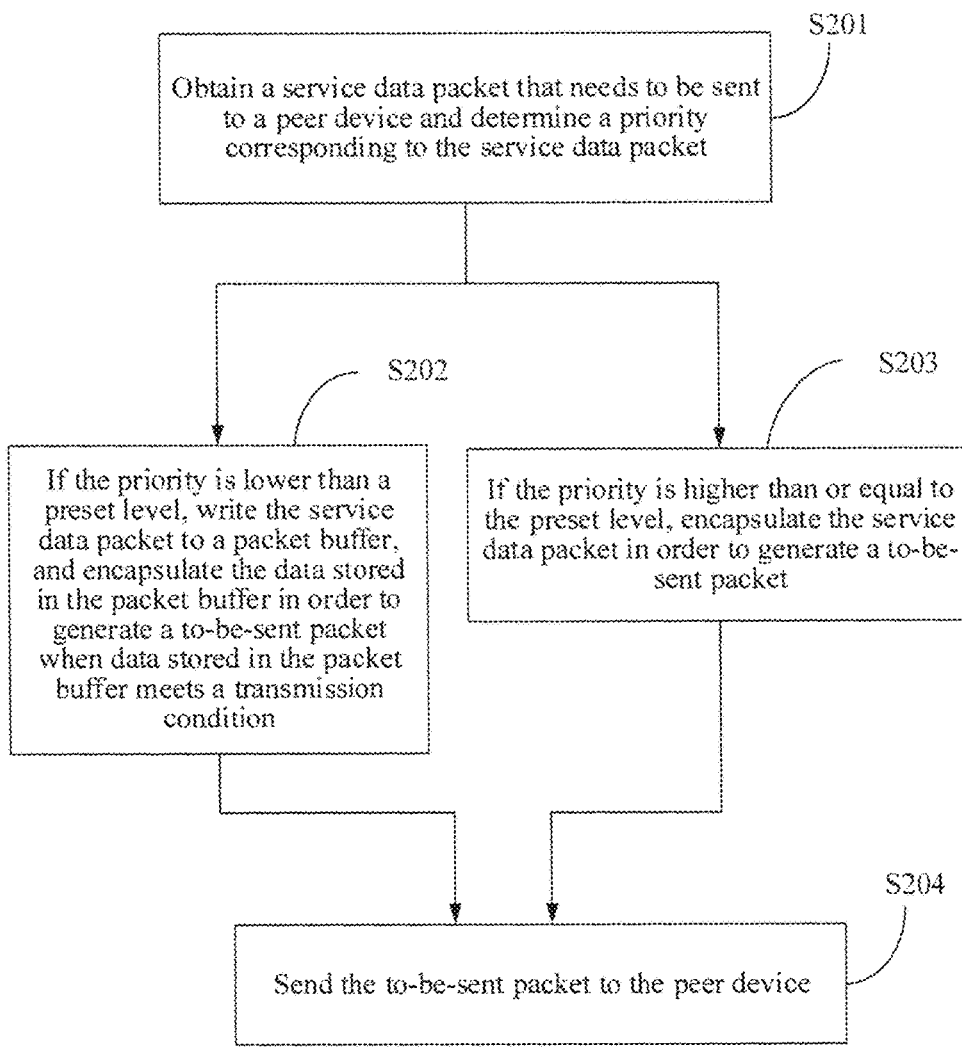
FIG. 2A is another schematic flowchart of a data transmission method according to an embodiment of the present disclosure.

Referring to FIG. 2A, FIG. 2A is another schematic flowchart of a data transmission method according to an embodiment of the present disclosure. In this embodiment of the present disclosure, the method may include the following steps.

Step S201: Obtain a service data packet that needs to be sent to a peer device and determine a priority corresponding to the service data packet.

Usually, a local device (for example, a wearable device) may record information about a user such as a heart rate, a running cadence, a running speed, and consumed calories using a sensing apparatus equipped on the local device, and report the information to a peer device (for example, a smartphone) in real time or periodically or store the information in a local storage medium (if the local device has a local storage function), or the peer device sends a request message to the local device when necessary, and the local device sends the information to the peer device using a response message. For example, the local device may measure a heart rate and a running cadence and speed of a wearer by integrating a heart rate sensor and a step count sensor. Besides, the local device may further support other services such as a battery service (BAS), a current time service (CTS), a device information service (DIS), a link loss service (LLS), a location & navigation service (LNS), a transmit power service (TPS), an ANS, an IAS, and a BLS, and therefore can transmit information about the local device, such as a state of charge, a current time, device information, transmit power, and an alert message, to the peer device. However, in an existing data transmission method, when transmitting data information of these services to the peer device, the local device directly encapsulates an obtained single service data packet into a packet, and sends the packet to the peer device. Therefore, each packet carries only one service data packet. However, one service data packet generally has only several octets or ten-odd octets, for example, eight or nine RR-Interval fields (representing eight or nine pieces of heart rate data), which is less than 23 octets, and is far less than a maximum payload length that can be carried by a packet (for example, 255 octets). Therefore, data transmission efficiency is relatively low, and an advantage of the maximum payload length that can be carried by a packet is completely not used.

In this embodiment of the present disclosure, considering that data information of services may have different transmission latency requirements, a priority level may be preset for each service, and the priority level reflects a transmission latency requirement of data information of each service. The priority level identifies a degree of importance or a degree of urgency of a service data packet. For example, a higher priority level indicates that data has a higher degree of importance and a higher degree of urgency, and has a higher transmission latency requirement, that is, is relatively sensitive about a transmission latency. Therefore, the data needs to be sent the first time. On the contrary, a lower priority level indicates that data has a lower degree of importance and a lower degree of urgency, and has a lower transmission latency requirement, that is, is highly tolerant of a transmission latency. Therefore, in this embodiment of the present disclosure, a relatively high priority level may be used to indicate a relatively high transmission latency requirement, and a relatively low priority level may indicate a relatively low transmission latency requirement.

During specific implementation, when the local device obtains a service data packet that needs to be sent to the peer device, it indicates that the local device needs to send service data information to the peer device. Therefore, the local device determines a priority corresponding to the service data packet. Therefore, whether a to-be-transmitted service data packet is relatively sensitive about a transmission latency can be learned according to a priority corresponding to the service data packet. If yes, the service data packet should be sent to the peer device as soon as possible. If not, to improve data transmission efficiency and reduce power consumption of transmission, the service data packet may be stored in a buffer, and until buffered data in the buffer is close to a maximum payload length that can be carried by a packet, the data and other data in the buffer are both encapsulated into a packet and the packet is sent to the peer device. It can be known that, during specific implementation, at least two sending manners may be set for a to-be-sent service data packet.

For ease of understanding, in an example, it is assumed that two sending manners are included, and are separately briefly referred to as a "manner 1" and a "manner 2". It should be noted that, the "manner 1" and the "manner 2" are intended only for description. In an example, it is assumed that transmission latency requirements of service data information are identified by "0" and "1", "0" identifies a relatively low transmission latency requirement, and "1" identifies a relatively high transmission latency requirement. The preset level may be set to "1". During specific implementation, if it is obtained that a priority corresponding to a to-be-transmitted service data packet is "0", that is, the priority corresponding to the to-be-transmitted service data packet is lower than the preset level, it may be determined that the service data packet has a relatively low transmission latency requirement, and therefore, it is determined that a manner of sending the service data packet is the "manner 1", referring to step S202. If it is obtained that a priority corresponding to a to-be-transmitted service data packet is "1", that is, the priority corresponding to the to-be-transmitted service data packet is not lower than the preset level, it may be determined that the service data packet has a relatively high transmission latency requirement, and therefore, it is determined that a manner of sending the service data packet is the "manner 2", referring to step S203.

In another example, priority levels may be identified by values 1 to N or characters "low, intermediate, and high", and a higher level indicates that a higher transmission latency requirement. During specific implementation, a preset level may be preset according to the identification manner. If a priority corresponding to a service data packet is lower than the preset level, it may indicate that the service data packet does not have a high transmission latency requirement, and it may be determined that a manner of sending the service data packet is the "manner 1", referring to step S202. If a priority corresponding to a service data packet is higher than or equal to the preset level, it may indicate that the service data packet has a relatively high transmission latency requirement, and it may be determined that a manner of sending the service data packet is the "manner 2", referring to step S203.

It should be noted that, during specific implementation, there may be two or more sending manners, which may be set according to an actual requirement, and is not limited in this embodiment of the present disclosure. For example, it is assumed that three sending manners are defined in advance. Transmission latency requirements of service data packets may be classified into three levels, each level corresponds to one sending manner, and a same sending manner may be used for service data packets at a same level. An example in which priority levels are identified by values 1 to N and characters "low, intermediate, and high" is used. A correspondence between a priority and a sending manner may be shown in Table 1. Table 1 is an example of a relationship between a priority level and a sending manner according to FIG. 1.

TABLE 1

| Priority (values 1 to N) | Priority (low, intermediate, and high) | Sending manner |
|---|---|---|
| 1 to 5 | Low | Manner 1 |
| 6 to 8 | Intermediate | Manner 2 |
| 9 to N | High | Manner 3 |

It can be seen from the foregoing table, if priority levels are identified by values 1 to N, when a priority level corresponding to a service data packet is in the first to the fifth levels, it indicates that the service data packet has a relatively low transmission latency requirement, and the "manner 1" may be used to send the service data packet, when a priority level corresponding to a service data packet is in the sixth to the eighth levels, it indicates that the service data packet has an intermediate transmission latency requirement, and the "manner 2" may be used to send the service data packet, and when a priority level corresponding to a service data packet is in the ninth to the $N^{th}$ levels, it indicates that the service data packet has a relatively high transmission latency requirement, and the "manner 3" may be used to send the service data packet. Correspondingly, if priority levels are identified by characters "low, intermediate, and high", when a priority level corresponding to a service data packet is "Low", the "manner 1" is used to send the service data packet, when a priority level corresponding to a service data packet is "Intermediate", the "manner 2" is used to send the service data packet, and when a priority level corresponding to a service data packet is "High", the "manner 3" is used to send the service data packet. It should be noted that, Table 1 is only an example. During specific implementation, the relationship should be set according to an actual requirement.

Step S202: If the priority is lower than a preset level, write the service data packet to a packet buffer, and encapsulate the data stored in the packet buffer in order to generate a to-be-sent packet when data stored in the packet buffer meets a transmission condition.

In this embodiment of the present disclosure, if the priority corresponding to the obtained service data packet that needs to be sent to the peer device is lower than the preset level, it indicates that the service data packet is insensitive about a transmission latency. Therefore, after a service data packet of such a type is obtained, the service data packet may be stored in the buffer. Only when data buffered in the buffer meets the transmission condition, data content stored in the buffer is encapsulated into a packet as a whole. That is, the data content stored in the buffer is used as a payload of a packet, and encapsulated according to a packet encapsulation specification of the packet type, to generate a to-be-sent packet. It can be known that, the packet includes at least one service data packet. During specific implementation, the payload in the packet usually includes multiple service data packets. In this way, the packet carries valid data as much as possible, which improves data transmission efficiency and reduces power consumption of transmission.

The transmission condition includes data that has been stored in the packet buffer reaches or exceeds a threshold, and the threshold is set according to a maximum payload length that can be carried by the to-be-sent packet, or a preset length of time elapses after the first service data packet is written to the packet buffer, and the preset length of time is set according to a maximum transmission latency allowed by the service data packet.

Step S203: If the priority is higher than or equal to the preset level, encapsulate the service data packet in order to generate a to-be-sent packet.

In this embodiment of the present disclosure, if the priority corresponding to the obtained service data packet that needs to be sent to the peer device is higher than or equal to the preset level, it indicates that the service data packet has a relatively high transmission latency requirement, that is, is relatively sensitive about a transmission latency. Therefore, once a service data packet of such a type is obtained, the service data packet may be encapsulated alone into a to-be-sent packet. That is, the service data packet is directly used as a payload of a packet, and encapsulated according to a packet encapsulation specification of the packet type, to generate a to-be-sent packet. It can be known that, a payload of the obtained to-be-sent packet includes one service data packet. In this way, a time from obtaining the service data packet to sending the service data packet to the peer device is short. Therefore, a speed of transmitting data of the type can be improved, a transmission latency of the part of data that has a relatively high transmission latency requirement can be reduced, and transmission requirements of different data can be met.

Figure 2B:
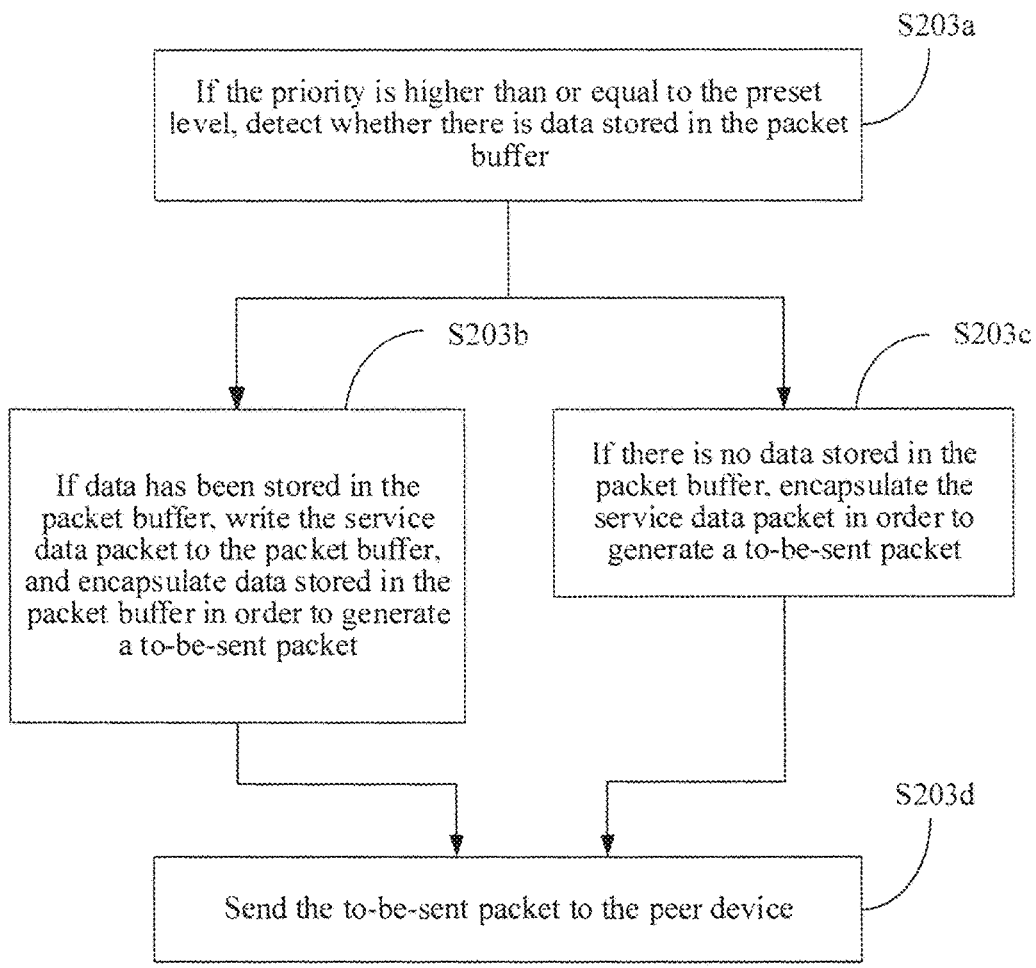
FIG. 2B is a schematic flowchart of a sending manner according to FIG. 2A.

In another feasible implementation manner, if the priority corresponding to the obtained service data packet that needs to be sent to the peer device is higher than or equal to the preset level, a manner of sending the service data packet may be shown in FIG. 2B. FIG. 2B is a schematic diagram of a sending manner according to FIG. 2A, including steps S203a to S203d.

Step S203a: If the priority is higher than or equal to the preset level, detect whether there is data stored in the packet buffer.

It can be known from the foregoing embodiment that, the packet buffer is configured to buffer a service data packet whose priority is relatively low. Therefore, in a data transmission process, when a service data packet whose priority is relatively high is obtained, it is possible that data has been stored in the packet buffer. Certainly, it is also possible that before the service data packet whose priority is relatively high is obtained, the data that has been stored in the packet buffer is cleared, and therefore, when the service data packet whose priority is relatively high is obtained, there is no data stored in the packet buffer. In this embodiment of the present disclosure, if the priority corresponding to the obtained service data packet is higher than or equal to the preset level, it is detected whether there is data stored in the packet buffer.

Step S203b: If data has been stored in the packet buffer, write the service data packet to the packet buffer, and encapsulate data stored in the packet buffer in order to generate a to-be-sent packet.

If it is detected that data has been stored in the packet buffer, the obtained service data packet whose priority is relatively high may be written to the packet buffer, and data stored in the packet buffer is immediately encapsulated in order to generate a to-be-sent packet. In this way, once a service data packet whose priority is relatively high is obtained, data that currently has been buffered in the packet buffer and the service data packet whose priority is relatively high are both encapsulated into a packet. That is, the service data packet and the data that has been buffered in the packet buffer are used as a payload of a to-be-sent packet, and encapsulated according to an encapsulation specification of the to-be-sent packet in order to generate the to-be-sent packet. The generated to-be-sent packet includes multiple service data packets, which not only can reduce a transmission latency of the part of data that has been buffered in the packet buffer, but also improves data transmission efficiency.

Step S203c: If there is no data stored in the packet buffer, encapsulate the service data packet in order to generate a to-be-sent packet.

If it is detected that there is no data stored in the packet buffer, the obtained service data packet whose priority is relatively high may be encapsulated alone into a packet. That is, the service data packet is used as a payload of a to-be-sent packet, and encapsulated according to an encapsulation specification of the to-be-sent packet in order to generate the to-be-sent packet. The generated to-be-sent packet includes one service data packet, which can improve a speed of transmitting the service data packet whose priority is relatively high.

Step S203d: Send the to-be-sent packet to the peer device.

After the to-be-sent packet is obtained, the packet is sent to the peer device such that after receiving the packet, the peer device may parse out one or more service data packets in the packet payload.

In a feasible implementation manner, during specific implementation, there are some services that have a particular transmission latency requirement but are neither sensitive nor insensitive about a transmission latency, that is, service data packets of the services have an intermediate transmission latency requirement. Therefore, during specific implementation, two preset levels, that is, a first preset level and a second preset level, may be set according to an actual requirement. The first preset level is lower than the second preset level. If a priority corresponding to a service data packet is lower than the first preset level, the encapsulation manner corresponding to step S202 may be used. If a priority corresponding to a service data packet is higher than or equal to the second preset level, the encapsulation manner corresponding to step S203 may be used. If a priority corresponding to a service data packet is higher than or equal to the first preset level but is lower than the second preset level, after a service data packet of such a type is obtained, the service data packet may be stored in the buffer, and only when data buffered in the buffer is close to a given preset value, data content stored in the buffer is used as a payload of a packet, and encapsulated according to a packet encapsulation specification of the packet type in order to generate a to-be-sent packet. The preset value is far less than a maximum payload length of the packet. During specific implementation, the packet includes at least one service data packet, and usually, a quantity of service data packets included in the payload of the packet is less than a quantity of service data packets in the payload of the packet in step S202. In this way, not only a transmission latency requirement can be met, but also transmission efficiency can be improved and power consumption of transmission can be reduced.

Step S204: Send the to-be-sent packet to the peer device.

After the to-be-sent packet is generated in the foregoing step, the packet is sent to the peer device such that the peer device parses out a corresponding service data packet from the packet.

In this embodiment of the present disclosure, after the to-be-sent packet is generated, the obtained packet is sent to the peer device. In step S203, the service data packet that needs to be sent to the peer device is directly encapsulated alone into a packet, and the encapsulated packet is sent to the peer device. In this way, a short time elapses from generating to sending the to-be-sent service data packet. However, a length of a valid payload loaded into the packet is short. Therefore, such a sending manner is applicable to service data information that has a relatively high transmission latency requirement or is relatively sensitive about a transmission latency. In step S202, for the obtained packet, only when data in the buffer meets the transmission condition, all the data in the buffer is loaded into a packet payload and encapsulated into a packet for sending. Therefore, a stage of storage in the buffer is included within a time from generating to sending the to-be-sent service data packet, and a transmission latency is relatively long. However, a length of a valid payload in the packet is long, and transmission efficiency is high and power consumption is low. Therefore, such a manner is applicable to service data information that has a relatively low transmission latency requirement or is relatively insensitive about a transmission latency.

In the data transmission method described in this embodiment of the present disclosure, a local device determines a priority corresponding to the service data packet when obtaining a service data packet that needs to be sent to a peer device, writes the to-be-sent service data packet to a packet buffer if the priority is lower than a preset level, encapsulates the data stored in the packet buffer in order to generate a to-be-sent packet when data stored in the packet buffer meets a transmission condition, and sends the generated to-be-sent packet to the peer device. By means of this embodiment of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

Figure 3A:
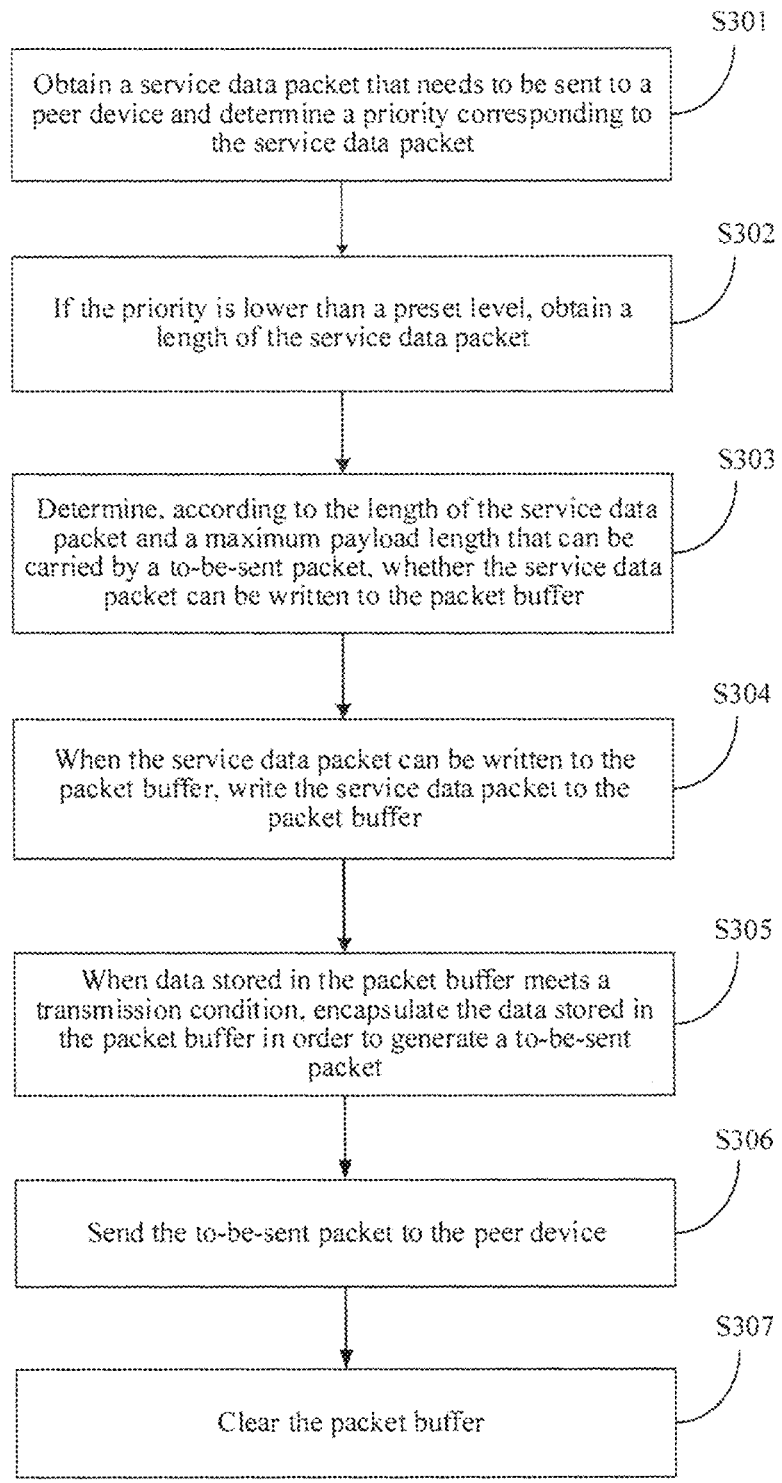
FIG. 3A is still another schematic flowchart of a data transmission method according to an embodiment of the present disclosure.

Referring to FIG. 3A, FIG. 3A is still another schematic flowchart of a data transmission method according to an embodiment of the present disclosure. In this embodiment of the present disclosure, the method may include the following steps.

Step S301: Obtain a service data packet that needs to be sent to a peer device and determine a priority corresponding to the service data packet.

In this embodiment of the present disclosure, a priority level corresponding to each service may be preset according to a transmission latency requirement of each service. In a feasible implementation manner, a correspondence between a service type and a priority level may be stored in advance in a preset database. After obtaining a data packet of a service that needs to be sent to a peer device, a local device may determine, according to a priority corresponding to the service, a priority corresponding to the service data packet. Certainly, the service data packet may carry the priority corresponding to the service data packet, and therefore, after obtaining the service data packet that needs to be sent to the peer device, the local device may obtain, by parsing the service data packet, the priority corresponding to the service data packet.

Step S302: If the priority is lower than a preset level, obtain a length of the service data packet.

In this embodiment of the present disclosure, if the priority corresponding to the service data packet is lower than the preset level, the service data packet needs to be stored in a packet buffer, and the service data packets are sent together when more service data packets are obtained. Due to a limitation by a maximum payload length that can be carried by a packet in order to avoid that buffered data encapsulated into a packet is greater than a maximum payload length of the packet, that is, a data overflow, in this embodiment of the present disclosure, before a to-be-transmitted service data packet is stored in the packet buffer, length information of the service data packet is obtained in order to identify whether the service data packet can be written to the packet buffer.

Step S303: Determine, according to the length of the service data packet and a maximum payload length that can be carried by a to-be-sent packet, whether the service data packet can be written to the packet buffer.

Figure 3B:
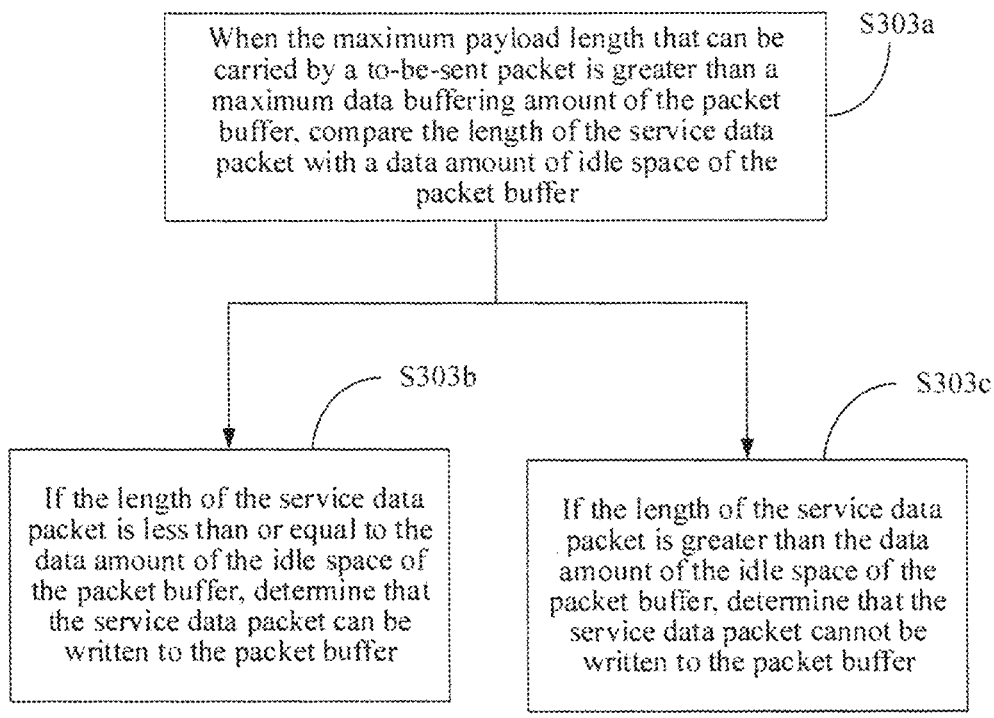
FIG. 3B is a schematic flowchart of a manner of identifying whether a service data packet can be written to a buffer according to FIG. 3A.

In a feasible implementation manner, specific technical details include that if the maximum payload length that can be carried by a packet is greater than a maximum capacity of the packet buffer, identifying whether the service data packet can be written to the packet buffer may be shown in FIG. 3B. FIG. 3B is a schematic flowchart of a manner of identifying whether a service data packet can be written to a buffer according to FIG. 3A, including steps S303a to S303c.

Step S303a: When the maximum payload length that can be carried by a to-be-sent packet is greater than a maximum data buffering amount of the packet buffer, compare the length of the service data packet with a data amount of idle space of the packet buffer.

If the maximum payload length that can be carried by a to-be-sent packet is greater than the maximum data buffering amount of the packet buffer, data content stored in the packet buffer is always less than the maximum payload length that can be carried by a packet. Therefore, identifying whether the service data packet can be written to the packet buffer includes identifying whether idle space of the packet buffer can accommodate the service data packet. Therefore, the length of the service data packet is compared with a data amount of the idle space of the packet buffer.

Step S303b: If the length of the service data packet is less than or equal to the data amount of the idle space of the packet buffer, determine that the service data packet can be written to the packet buffer.

For example, it is assumed that the maximum data buffering amount of the packet buffer is 255 octets, the maximum payload length that can be carried by a packet is 255 octets, and 220-octet data has been stored in the packet buffer. It can be learned that the idle space of the packet buffer is 25 octets. Therefore, if the length of the to-be-buffered service data packet is less than or equal to 25 octets, it is determined that the service data packet can be written to the packet buffer.

Step S303c: If the length of the service data packet is greater than the data amount of the idle space of the packet buffer, determine that the service data packet cannot be written to the packet buffer.

For example, it is assumed that the maximum data buffering amount of the packet buffer is 255 octets, the maximum payload length that can be carried by a packet is 255 octets, and 220-octet data has been stored in the packet buffer. It can be learned that the idle space of the packet buffer is 25 octets. Therefore, if the length of the to-be-buffered service data packet is greater than 25 octets, it is determined that the service data packet cannot be written to the packet buffer. In this case, after data content in the packet buffer is encapsulated into a packet and sent to the peer device and the packet buffer is cleared, the service data packet is written to the packet buffer.

Figure 3C:
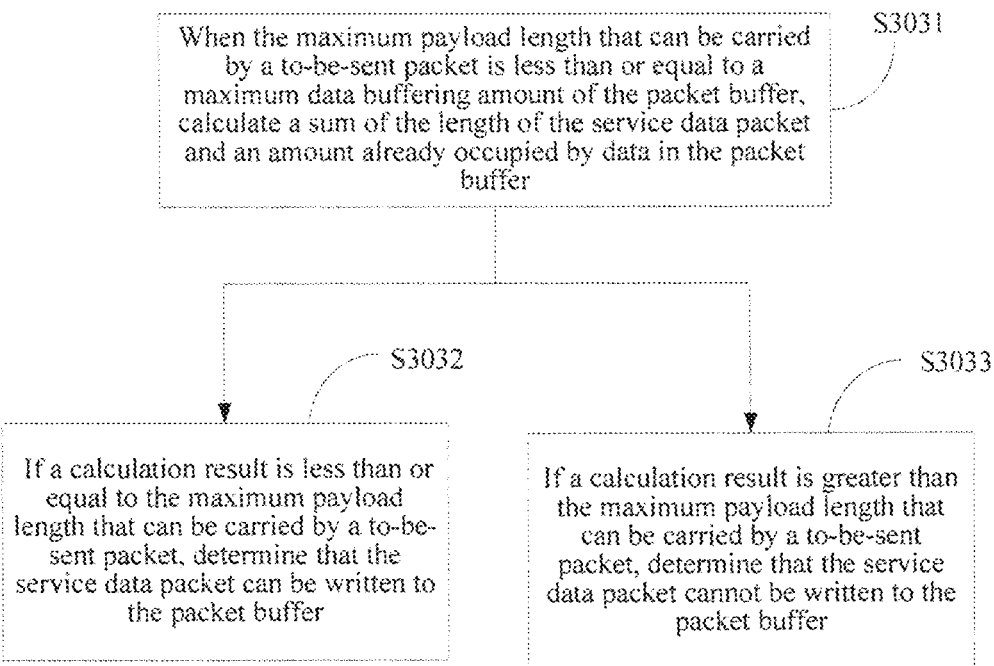
FIG. 3C is a schematic flowchart of another manner of identifying whether a service data packet can be written to a buffer according to FIG. 3A.

In another feasible implementation manner, specific technical details include that if the maximum payload length that can be carried by a packet is less than or equal to a maximum capacity of the packet buffer, identifying whether the service data packet can be written to the packet buffer may be shown in FIG. 3C. FIG. 3C is a schematic flowchart of another manner of identifying whether a service data packet can be written to a buffer according to FIG. 3A, including steps S3031 to S3033.

Step S3031: When the maximum payload length that can be carried by a to-be-sent packet is less than or equal to a maximum data buffering amount of the packet buffer, calculate a sum of the length of the service data packet and an amount already occupied by data in the packet buffer.

If the maximum payload length that can be carried by a to-be-sent packet is less than or equal to the maximum data buffering amount of the packet buffer, data content stored in the packet buffer should be less than or equal to the maximum payload length that can be carried by a packet. Otherwise, a data overflow is caused when the data content stored in the packet buffer is encapsulated into a packet. Therefore, the sum of the amount already occupied by data in the packet buffer and the length of the service data packet is calculated in order to identify whether a calculation result is less than or equal to the maximum payload length that can be carried by a packet. If yes, it is determined that the service data packet can be written to the packet buffer. If not, it is determined that the service data packet cannot be written to the packet buffer.

Step S3032: If a calculation result is less than or equal to the maximum payload length that can be carried by a to-be-sent packet, determine that the service data packet can be written to the packet buffer.

For example, it is assumed that the maximum payload length that can be carried by a packet is 251 octets, the maximum data buffering amount of the packet buffer is greater than 251 octets, for example, 300 octets, 220-octet data has been stored in the packet buffer, and the length of the service data packet is 20 octets. It can be known that, a sum of an amount already occupied by the data in the packet buffer and the length of the service data packet is 242 octets, and is less than the maximum payload length that can be carried by a packet (255 octets). Therefore, it is determined that the service data packet can be written to the packet buffer.

Step S3033: If a calculation result is greater than the maximum payload length that can be carried by a to-be-sent packet, determine that the service data packet cannot be written to the packet buffer.

For example, it is assumed that the maximum payload length that can be carried by a packet is 251 octets, the maximum data buffering amount of the packet buffer is greater than 251 octets, for example, 300 octets, 220-octet data has been stored in the packet buffer, and the length of the service data packet is 40 octets. It can be known that, a sum of an amount already occupied by the data in the packet buffer and the length of the service data packet is 262 octets, and is greater than the maximum payload length that can be carried by a packet (255 octets). Therefore, it is determined that the service data packet cannot be written to the packet buffer. In this case, after data content in the packet buffer is encapsulated into a packet and sent to the peer device and the packet buffer is cleared, the service data packet is written to the packet buffer. In this way, it is ensured that the packet buffer is repeatedly used and data does not overflow.

It should be noted that, if a transmission condition is that data that has been stored in the packet buffer reaches or exceeds a threshold, for example, it is assumed that a maximum payload length of a to-be-sent packet is 255 octets in order to make a payload length of a packet close to 255 octets, the threshold may be set to a value close to 255 octets, such as 200 octets or 210 octets. It should be noted that, a specific value is not limited in this embodiment of the present disclosure. Therefore, the manner of identifying whether the service data packet can be written to the packet buffer may include calculating a sum of the length of the service data packet and an amount of data that has been stored in the packet buffer, and if a calculation result is greater than or equal to the threshold but is less than or equal to the maximum payload length, or if the calculation result is less than the threshold, determining that the service data packet can be written to the packet buffer, or determining that the service data packet cannot be written to the packet buffer if the result is greater than the maximum payload length. In this case, after data content in the packet buffer is encapsulated into a packet and sent to the peer device and the packet buffer is cleared, the service data packet is written to the packet buffer. In this way, it is ensured that the packet buffer is repeatedly used and data does not overflow.

For example, it is assumed that the maximum payload length that can be carried by a packet and the maximum buffering capacity of the packet buffer are 255 octets, the amount of data that has been stored in the packet buffer is 208 octets, the preset threshold is 210 octets, and the length of the to-be-stored service data packet is 50 octets. It can be known that, 208+50=258 octets, which is greater than the maximum payload length, it is determined that the service data packet cannot be written to the packet buffer, and after data content in the packet buffer is encapsulated into a packet and sent to the peer device and the packet buffer is cleared, the service data packet is written to the packet buffer. If the length of the to-be-stored service data packet is 10 octets, it can be known that, 208+10=218 octets, a sum of the length of the service data packet and the amount of data that has been stored in the packet buffer is greater than the threshold but is less than the maximum payload length, it is determined that the service data packet can be written to the packet buffer, and after the service data packet is written to the packet buffer, it can be identified that the packet buffer meets the transmission condition.

Step S304: When the service data packet can be written to the packet buffer, write the service data packet to the packet buffer.

If the service data packet can be written to the packet buffer, the service data packet is written to the packet buffer. It should be noted that, because the payload of the to-be-sent packet may include multiple service data packets in order to make it more convenient for the peer device to parse out the multiple service data packets from the packet, during specific implementation, different service data packets may be separated using a preset separator. The preset separator may be a binary digital sequence having a particular length, used to distinguish different data frames. In other words, the preset separator is a segmentation point of two adjacent data frames. During specific implementation, the preset separator is preferably a character or binary sequence that does not appear in service data information, for example, may be a character string that is forbidden in service data information or a character string that barely appears in service data information, for example, a string of "0" or a string of "1". A length of the preset separator may be 8 bits or 16 bits. A specific length may be set according to an actual required or set by a system, which is not limited in this embodiment of the present disclosure.

In another feasible implementation manner, it assumed that the first octet of a service data packet indicates a length of the service data packet. After receiving a packet, the peer device parses out a payload from the packet. If a length indicated by the first octet of the first service data packet is less than a length of the payload, it indicates that the payload of the packet includes multiple data packets. Therefore, multiple data packets in the packet payload can be determined according to a length indicated by the first octet of each data packet. On the contrary, data content in the packet payload is determined as one data packet.

In a preferred implementation manner, after writing a service data packet whose priority is relatively low to the packet buffer, the local device may further add a preset separator at the end or beginning of the service data packet, that is, writes a preset separator at the end or beginning of the service data packet. It should be noted that, after it is identified that the service data packet can be written to the packet buffer, the preset separator may be first written to the packet buffer, and then the service data packet is written to the packet buffer. A specific manner is not limited in this embodiment of the present disclosure, as long as different service data packets can be distinguished by the preset separator. In this way, after receiving a packet, the peer device identifies whether there is a preset separator in a payload of the packet. If not, it indicates that the payload of the packet includes only one service data packet, and therefore, data content in the packet payload may be determined as one service data packet. If yes, it indicates that the payload of the packet includes multiple service data packets, and therefore, the multiple service data packets in the packet payload may be determined according to a quantity of preset separators and a location at which a preset separator appears.

Figure 3D:
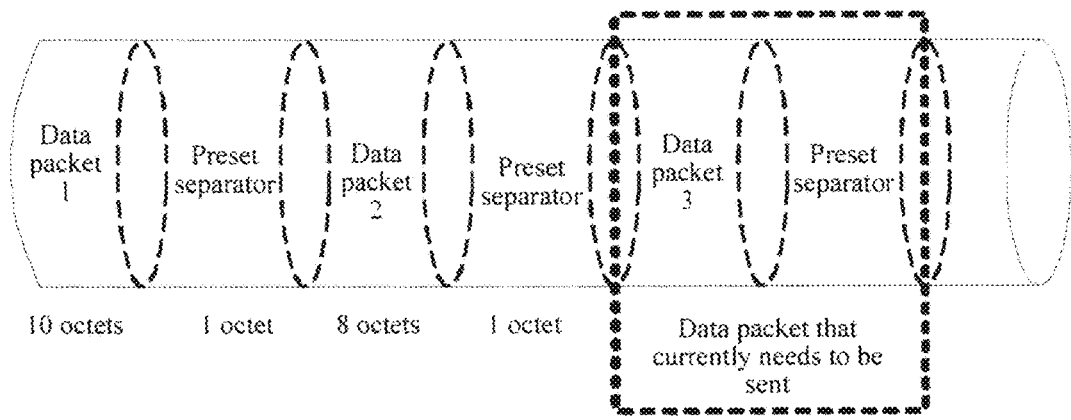
FIG. 3D is a schematic diagram of a storage manner of a packet buffer according to FIG. 3A.

For ease of understanding, in this embodiment of the present disclosure, an example in which a preset separator is added at the end of a service data packet is used. Referring to FIG. 3D, FIG. 3D is a schematic diagram of a storage manner of a packet buffer according to FIG. 3A. In the figure, it is assumed that a maximum payload amount that can be carried by a packet is 251 octets, and maximum storage space of the packet buffer is preset to 251 octets. It is assumed that a preset separator occupies 1 octet. It can be seen from FIG. 3D, the buffer has stored two service data packets (designated as "Data packet 1" and a "Data packet 2") and two preset separators, which have occupied 20-octet space of the packet buffer. It can be known that, the buffered data stored in the packet buffer is far less than 251 octets. Therefore, if a priority corresponding to a service data packet that currently needs to be sent is relatively low, and a length is 20 octets, the data packet may be stored in the buffer (designated as "Data packet 3"), and a preset separator is stored at the end of the data packet. In this way, after receiving a packet, the peer device first parses out a payload of the packet from the packet, and then identifies whether there is a preset separator in the payload. If yes, the payload is segmented according to a quantity of preset separators and a location at which a preset separator appears in the payload, to obtain multiple segments, and data content corresponding to each segment is determined as one service data packet. If not, it may be determined that the payload of the packet is one service data packet. In this way, one or more transferred service data packets are obtained from the packet.

Step S305: When data stored in the packet buffer meets a transmission condition, encapsulate the data stored in the packet buffer in order to generate a to-be-sent packet.

In this embodiment of the present disclosure, the local device may periodically detect whether data stored in the packet buffer meets the transmission condition, or may detect whether data stored in the packet buffer meets the transmission condition after writing a service data packet whose priority is lower than the preset level to the packet buffer. A specific manner is not limited in this embodiment of the present disclosure. If the data stored in the packet buffer meets the transmission condition, the data stored in the packet buffer is encapsulated in order to generate a to-be-sent packet.

In a feasible implementation manner, the transmission condition may be that data that has been stored in the packet buffer reaches or exceeds a threshold, and the threshold is set according to a maximum payload length that can be carried by the to-be-sent packet. In this way, it is ensured that the data stored in the packet buffer does not exceed the maximum payload length that can be carried by the packet, but is close to or reaches the maximum payload length. Therefore, a service data packet whose priority is relatively low is written to the packet buffer such that an actual payload length of a to-be-transmitted packet is close as far as possible to or reaches a maximum payload length that can be carried by the packet in order to improve data transmission efficiency and reduce power consumption of transmission.

For example, using a BLE packet in a BLUETOOTH transmission process as an example, referring to a frame format of a BLE packet that is shown in FIG. 1B, if a maximum payload length of the BLE packet is 255 octets, because the maximum payload length is a sum of a Payload and an MIC (4 octets), it can be known that, a maximum payload amount that can be carried by the BLE packet is 251 octets. It should be noted that, during actual processing, a maximum payload amount of a packet is usually a maximum payload length of the packet, that is, the maximum payload length is described with respect to a data amount of a payload. However, because packets of different types have different frame formats, there may be some differences. For example, a maximum payload length stipulated in a BLE packet is described with respect to a data amount of a payload and an MIC field, and the MIC field is fixedly 4 octets. Therefore, a maximum payload amount that can be carried by a packet can be directly determined according to a maximum payload length of the packet. For example, assuming that a maximum payload length of a BLE packet is 31 octets, it may be determined that a maximum payload amount is 27 octets. For ease of description, an example in which a maximum payload amount of a packet is a maximum payload length of the packet is used below.

Usually, a data overflow problem occurs after the buffer is fully filled. Therefore, the preset threshold should be lower than or equal to the maximum payload length. However, if the threshold is set excessively low, an actual payload length of a packet obtained through encapsulation is affected, failing to improve data transmission efficiency and reduce power consumption. Therefore, the threshold needs to be set according to the maximum payload length of the packet. For example, it is assumed that a maximum payload length of a to-be-sent packet is 255 octets in order to make a payload length of the packet close to 255 octets, the threshold may be set to a value close to 255 octets, such as 200 octets or 210 octets. It should be noted that, a specific value is not limited in this embodiment of the present disclosure. During specific implementation, the threshold may be adjusted or set according to an actual requirement. For example, assuming that a priority of a to-be-sent service data packet is relatively low, the threshold may be set as high as possible, and certainly, cannot exceed the maximum payload length of the packet. For another example, assuming that a priority of a to-be-sent service data packet is intermediate, the threshold may be not set close to the maximum payload length but should not be excessively low. For example, assuming that the maximum payload length is 255 octets, the threshold may be set to 120 octets, 150 octets, or the like. In this way, a transmission speed is ensured and data transmission efficiency can be improved.

If an amount of data in the buffer is greater than or equal to the preset threshold, data content stored in the buffer is encapsulated into a payload of a packet, to generate a to-be-sent packet. The data content includes at least one service data packet. If an amount of data in the buffer is less than the preset threshold, encapsulation waits such that more data packets of the type are filled in the buffer, and until buffered data in the buffer reaches or exceeds the threshold, data content stored in the buffer is encapsulated into a payload of a packet in order to generate a to-be-sent packet.

In another feasible implementation manner, the transmission condition may be that a preset length of time elapses after the first service data packet is written to the packet buffer, and the preset length of time is set according to a maximum transmission latency allowed by the service data packet. In this way, data transmission efficiency is improved and power consumption of transmission is reduced, and at the same time, a transmission latency requirement of to-be-transmitted data is met.

In another feasible implementation manner, the transmission condition may be that a quantity of service data packets written to the packet buffer reaches a preset quantity, and the preset quantity is set according to a maximum payload length that can be carried by the to-be-sent packet and a length of a service data packet. For example, assuming that the maximum payload length is 255 octets, and the length of a service data packet is 20 octets, the preset quantity may be preset to 12.

Step S306: Send the to-be-sent packet to the peer device.

After the to-be-sent packet is generated in the foregoing step, the packet is sent to the peer device such that the peer device parses out a corresponding service data packet from the packet. During specific implementation, the packet buffer may be further cleared after data content in the packet buffer is encapsulated into a packet and sent to the peer device in order to buffer a subsequent to-be-sent service data packet whose priority is relatively low, and improve utilization.

Step S307: Clear the packet buffer.

The buffer is cleared after data content in the packet buffer is encapsulated into a packet and sent to the peer device in order to buffer a subsequent to-be-sent service data packet whose priority is relatively low, and improve utilization.

In the data transmission method described in this embodiment of the present disclosure, a local device determines a priority corresponding to the service data packet when obtaining a service data packet that needs to be sent to a peer device, writes the to-be-sent service data packet to a packet buffer if the priority is lower than a preset level, encapsulates the data stored in the packet buffer in order to generate a to-be-sent packet when data stored in the packet buffer meets a transmission condition, and sends the generated to-be-sent packet to the peer device. By means of this embodiment of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

Figure 3E:
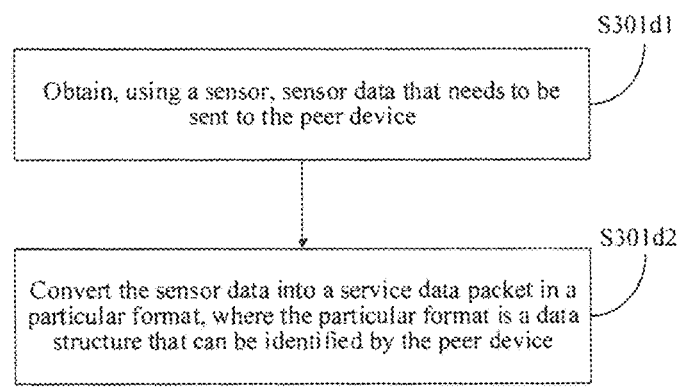
FIG. 3E is a schematic flowchart of a manner of obtaining a service data packet according to an embodiment of the present disclosure.

It should be noted that, in the foregoing embodiment, service data information that needs to be sent to the peer device may be obtained using a sensor, and a manner of obtaining the service data packet that needs to be sent to the peer device may be shown in FIG. 3E. FIG. 3E is a schematic flowchart of a manner of obtaining a service data packet according to an embodiment of the present disclosure, which may include steps S301d1 and S301d2.

Step S301d1: Obtain, using a sensor, sensor data that needs to be sent to the peer device.

Generally, different services have different service data information obtaining manners. For example, data of services such as an HRS, a BLS, a glucose service (GLS), a healthy thermometer service (HTS), and a running speed and cadence service (RSCS) is usually obtained using a sensor. Therefore, a manner of generating service data information of such a service type may be obtaining original data using a sensor. The sensor (Transducer/Sensor) is a detection apparatus, which can sense measured information, and can convert, according to a particular law, the sensed information into an electrical signal or information in another required form for output in order to meet requirements such as information transmission, processing, storage, display, recording, and control. During specific implementation, related processing, for example, processing such as data noise reduction, data transformation, and data encoding, needs to be performed on the original data obtained by the sensor in order to obtain sensor data that needs to be sent to a primary device, for example, data such as a heart rate and a running cadence.

Step S301d2: Convert the sensor data into a service data packet in a particular format, where the particular format is a data structure that can be identified by the peer device.

After the sensor data that needs to be sent to the peer device is obtained, the sensor data is converted into a service data packet in a particular format according to a related encapsulation specification, where the particular format is a data structure that can be identified by the peer device, for example, a frame format of a data frame. A specific frame format needs to be set according to an actual use scenario, and is not limited in this embodiment of the present disclosure.

Figure 3F:
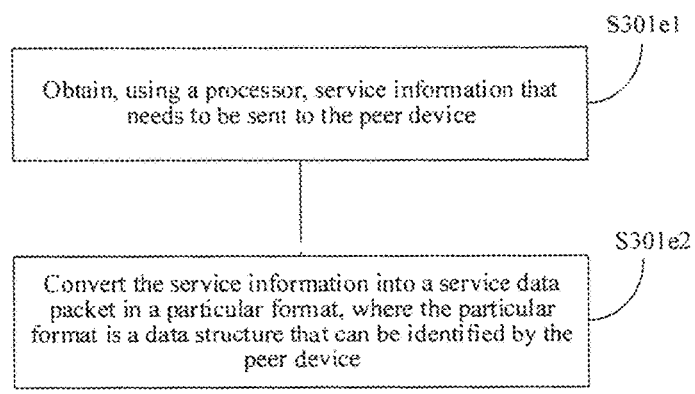
FIG. 3F is a schematic flowchart of another manner of obtaining a service data packet according to an embodiment of the present disclosure.

It should be noted that, in the foregoing embodiment, service information that needs to be sent to the peer device may be obtained using a processor, and a manner of obtaining the service data packet that needs to be sent to the peer device may be shown in FIG. 3F. FIG. 3F is a schematic flowchart of another manner of obtaining a service data packet according to an embodiment of the present disclosure, which may include the following steps.

Step S301e1: Obtain, using a processor, service information that needs to be sent to the peer device.

Generally, different services have different service data information obtaining manners. For example, original data of device attribute and status related services such as a CTS and a DIS and alert services such as an ANS and an IAS is directly generated in a processor of the local device. Therefore, service data information of such a service type may be directly obtained using a processor. In this embodiment of the present disclosure, service information that needs to be sent to the peer device is obtained using a processor. For example, the service information may be attribute information of the local device, for example, a time and a state of charge. In an example, for an alert service, the processor performs monitoring in real time with respect to a trigger condition of sending alert information, and once the trigger condition is met, generates service information that needs to be sent to the peer device.

Step S301e2: Convert the service information into a service data packet in a particular format, where the particular format is a data structure that can be identified by the peer device.

After the service information that needs to be sent to the peer device is obtained, the service information is converted into a service data packet in a particular format according to a related encapsulation specification. The particular format is a data structure that can be identified by the peer device, for example, a frame format of a data frame. A specific frame format needs to be set according to an actual use scenario, and is not limited in this embodiment of the present disclosure.

Figure 4:
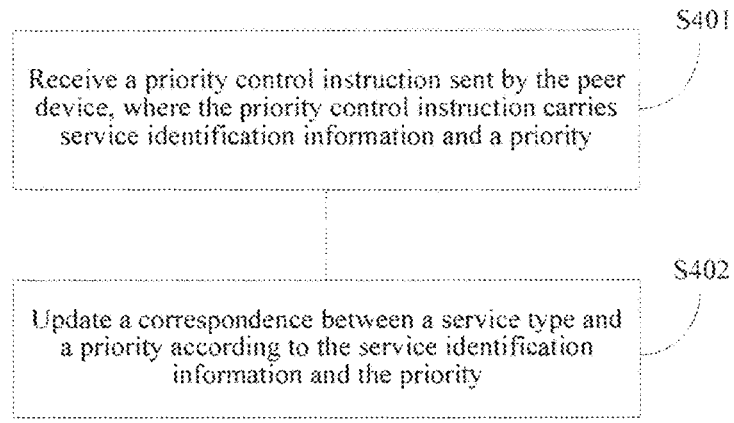
FIG. 4 is a schematic flowchart of a manner of adjusting a priority level according to an embodiment of the present disclosure.

It should be noted that, in the foregoing embodiment, the peer device may dynamically adjust a correspondence between a service type and a priority level in the local device according to a specific application scenario or user operation. Therefore, the method further includes a step of adjusting, according to an actual requirement, a priority level corresponding to a service. FIG. 4 is a schematic flowchart of a manner of adjusting a priority level according to an embodiment of the present disclosure, which may include the following steps.

Step S401: Receive a priority control instruction sent by the peer device, where the priority control instruction carries service identification information and a priority.

In an example, the correspondence between a service type and a priority level may be stored in a database. For ease of description, it is assumed that priority levels include three levels, "high" (High), "intermediate" (Intermediate), and "low" (Low), and correspondences between some services and the priority levels are specially listed, which may be shown in Table 2. Table 2 is a storage example of the database.

TABLE 2

| Service type | Priority level |
|---|---|
| HRS | High |
| ANS | Intermediate |
| BAS | Low |
| CTS | Low |

In this embodiment of the present disclosure, the local device receives a priority control instruction sent by the peer device, and the priority control instruction carries service identification information and a priority. For example, the service identification information is "HRS", and the priority is "Low".

Step S402: Update a correspondence between a service type and a priority according to the service identification information and the priority.

In an example, assuming that the service identification information is "HRS" and the priority is "Low", a priority level of the HRS in the correspondence between a service type and a priority level is updated to "low".

In this way, the peer device may dynamically update the correspondence between a service type and a priority level in the local device according to an application scenario and a user operation. For example, when a user is in a sleep state, it indicates that the user cares more about sleep quality. Therefore, the priority level of the HRS that is of a motion type is automatically updated from "high" to "low", which can reduce unnecessarily frequent transmission of heart rate data, reduce power consumption, and prolong a service life of the device.

It should be noted that, during specific implementation, adjusting the correspondence between a service type and a priority level may be receiving, by the local device, status information sent by the peer device, and updating the correspondence between a service type and a priority according to the status information. For example, the status information may be a display status of a screen on the peer device, for example, an on state or a screen locked state, or may be a running status of an application program to which a service belongs, for example, a foreground running state or a background running state. Certainly, the local device may identify a current application scenario according to the obtained service data packet, and if necessary, updates the correspondence between a service type and a priority level. For specific technical details, refer to a description in the following embodiment.

In an example, using the HRS as an example, as it is well known that heart rate data of people is generally 60 to 100 times/minute, if the local device learns, according to obtained heart rate data packets, that heart rate data within a period of time is obviously above the data, the local device may identify that a user may be in a motion state. Therefore, the local device needs to send the heart rate data to the peer device in real time. If a priority level corresponding to the HRS in the correspondence between a service type and a priority level is relatively low, the local device may raise the priority level corresponding to the HRS such that the local device sends heart rate data to the peer device the first time after obtaining the heart rate data.

Figure 5:
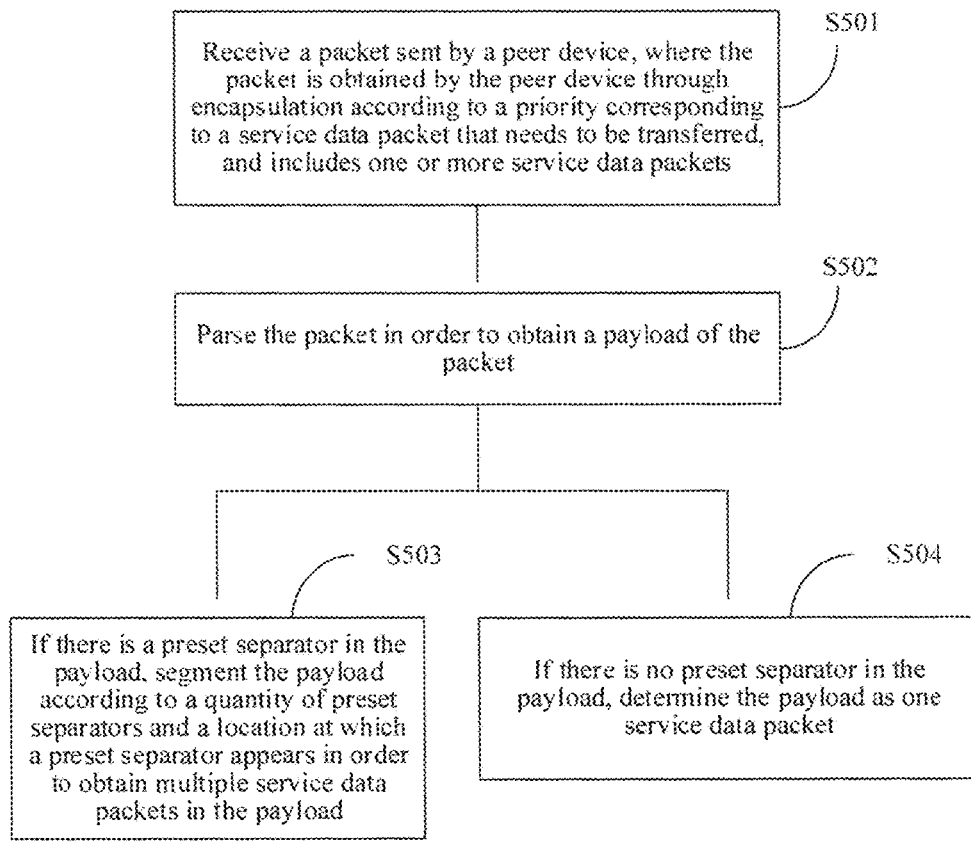
FIG. 5 is yet another schematic flowchart of a data transmission method according to an embodiment of the present disclosure.

It can be known from the foregoing embodiment, when the local device sends a packet to the peer device, a payload of the packet may include one or more service data packets. Therefore, after receiving the packet, the peer device needs to parses out the one or more service data packet from the payload of the packet. Referring to FIG. 5, FIG. 5 is still another schematic flowchart of a data transmission method according to an embodiment of the present disclosure. The data transmission method described in FIG. 5 in this embodiment of the present disclosure corresponds to the foregoing embodiment. Therefore, for same or similar technical detail parts, refer to the foregoing embodiment, which are not described one by one again in the following embodiment.

Referring to FIG. 5, FIG. 5 is still another schematic flowchart of a data transmission method according to an embodiment of the present disclosure. In this embodiment of the present disclosure, the method may include the following steps.

Step S501: Receive a packet sent by a peer device, where the packet is obtained by the peer device through encapsulation according to a priority corresponding to a service data packet that needs to be transferred, and includes one or more service data packets.

It should be noted that, this embodiment of the present disclosure is described from the perspective of the peer device in the foregoing embodiment, that is, the foregoing embodiment may be considered as a data sending party, and this embodiment of the present disclosure may be considered as a data receiving party. Therefore, when a description is provided from the perspective of the data receiving party, the data receiving party may be referred to as a "local device", and the data sending party may be referred to as a "peer device".

During specific implementation, when data is transmitted between the local device and the peer device, the local device establishes a communication connection, for example, a BLUETOOTH connection or an infrared connection, to the peer device. A specific connection manner is not limited in this embodiment of the present disclosure. Usually, in a wireless transmission manner, data is transmitted in a form of a packet, and to-be-transmitted target data is loaded into a payload of a to-be-transmitted packet.

When obtaining a service data packet that needs to be sent to the data receiving party, the data sending party determines a priority corresponding to the service data packet. If the priority is lower than a preset level, the data sending party writes the service data packet to a packet buffer, and when data stored in the packet buffer meets a transmission condition, encapsulates the data stored in the packet buffer in order to generate a to-be-sent packet, and it can be known that, the packet includes multiple service data packets. If the priority is higher than or equal to the preset level, the data sending party encapsulates the service data packet in order to generate a to-be-sent packet, and it can be known that, the packet includes one service data packet. Alternatively, if the priority is higher than or equal to the preset level, the data sending party detects whether there is data stored in the packet buffer, and if data has been stored in the packet buffer, writes the service data packet to the packet buffer, and encapsulates the data stored in the packet buffer, to generate a to-be-sent packet, and it can be known that, the packet includes multiple service data packets. The generated to-be-sent packet is sent to the data receiving party. Different service data packets are distinguished by a preset separator.

Step S502: Parse the packet in order to obtain a payload of the packet.

The packet is parsed according to a frame format specification of the packet to parse out the payload of the packet from the packet, and it is detected whether there is a preset separator in the payload of the packet. If yes, it indicates that the payload of the packet includes multiple service data packets. If not, it indicates that the payload of the packet includes only one service data packet.

Step S503: If there is a preset separator in the payload, segment the payload according to a quantity of preset separators and a location at which a preset separator appears in order to obtain multiple service data packets in the payload.

During specific implementation, if there is a preset separator in the payload, all preset separators are parsed out from the payload, to obtain a quantity of the preset separators and locations at which the preset separators appear. If no preset separator appears at the beginning of the payload, content between the first octet of the payload and the first preset separator that appears in the payload and content between two adjacent preset separators are used as service data packets in order to obtain the multiple service data packets in the payload. If no preset separator appears at the end of the payload, content between the last preset separator that appears in the payload and the last octet of the payload and content between two adjacent preset separators are used as service data packets, to obtain the multiple service data packets in the payload.

For example, assuming that corresponding data content in the payload of the packet is shown in FIG. 3D, it may be obtained that the multiple service data packets in the payload are a "data packet 1", a "data packet 2", and a "data packet 3".

Step S504: If there is no preset separator in the payload, determine the payload as one service data packet.

If there is no preset separator in the payload, it indicates that the payload carries only one service data packet. Therefore, data content in the payload may be determined as one service data packet.

It should be noted that, during specific implementation, a service data packet in a packet may be obtained in another manner. In an example, it is assumed that the first octet of a service data packet is used to indicate a length of the service data packet. After a packet sent by the peer device is received, a payload is parsed out from the packet. If a length indicated by the first octet of the first service data packet in the payload is less than a length of the payload, it indicates that the payload of the packet includes multiple service data packets. Therefore, the first service data packet may be determined according to data content of the first octet. Correspondingly, data content of a single octet after the first service data packet is obtained in order to determine the second service data packet, and so on. In this way, multiple service data packets in the packet payload can be determined according to a length indicated by the first octet of each service data packet. On the contrary, if the length indicated by the first octet of the first service data packet in the payload is equal to the length of the payload, it indicates that the payload includes only one service data packet. Therefore, data content of the payload is determined as one service data packet.

In the data transmission method described in this embodiment of the present disclosure, a packet sent by a peer device is received, and the packet is parsed to obtain a payload of the packet. If there is a preset separator in the payload, multiple service data packets in the payload are parsed out according to a quantity preset separators and a location at which a preset separator appears. If there is no preset separator in the payload, the payload is directly determined as one service data packet. In this way, one or more service data packets in the packet are obtained in order to complete data transmission. By means of this embodiment of the present disclosure, data transmission efficiency can be improved and power consumption of transmission can be reduced.

It should be noted that, in the foregoing embodiment, after obtaining the one or more service data packets in the packet, the local device may further parse the obtained service data packet in order to obtain a priority corresponding to the service data packet. Certainly, the local device may store a correspondence between a service type and a priority, and determine, according to a target service corresponding to the service data packet, the priority corresponding to the service data packet. In one aspect, the local device may load or update data content of the target service in a target application program according to the service data packet, or display service data information in the service data packet using a screen, or execute another processing operation. In another aspect, the local device may control, according to the priority corresponding to the service data packet, the peer device to update a priority level of the target service corresponding to the service data packet. Therefore, in the foregoing embodiment, the method may further include sending a priority control instruction to the peer device, and the priority control instruction carries service identification information and a priority such that the peer device updates a priority of a target service specified by the service identification information.

In this embodiment of the present disclosure, two factors, an application scenario and a user operation, are mainly considered in dynamically adjusting a priority level of a target service corresponding to a service data packet. For example, for the application scenario, using an HRS as an example, the HRS service may be applied to different application scenarios, for example, running and sleep monitoring. When in a running scenario, motion parameters and physiological indexes (including a heart rate) measured by the peer device, such as a sensor, need to be displayed on the local device in real time such that a user learns a physiological index change and a motion effect of the user in real time. Therefore, information data of the HRS service in the scenario has a relatively high transmission latency requirement such that heart rate data can be updated and presented in real time. However, if the HRS service is applied to a sleep monitoring scenario, because the user is asleep, heart rate data is mainly used to determine sleep quality of the user and monitor whether the user enters a deep sleep, in this case, it is not necessary to transmit the heart rate data to the peer device in real time. Therefore, information data of the HRS service in the scenario has a relatively low transmission latency requirement. In this embodiment of the present disclosure, priorities of a same service in different application scenarios are adjusted, which are mainly indicated in running of different application programs in the local device (for example, a smartphone). Still using the HRS service as an example, usually, multiple application programs are installed in the local device. An application program A is responsible for measuring and monitoring a motion status of a user, and another application program B is responsible for monitoring sleep quality of the user. Therefore, when the local device runs the application program A, it is considered that the local device is currently in an application scenario of running or motion. If the local device runs the application program B, it is considered that the local device is currently in an application scenario of sleep monitoring.

Similarly, a user operation often reflects an intention of a user. For example, still using the HRS as an example, the peer device obtains heart rate data using a heart rate sensor and transmits the heart rate data to the local device, and the user may open a corresponding application program in the local device to view the heart rate data of the user. When the local device is in a screen off state, or the corresponding application is in a background running state, it indicates that the user currently does not want to know heart rate data of the user, and a priority level of information data of the HRS service may be lowered. However, when the screen of the local device is on, and the corresponding application is switched to foreground running, it indicates that the user currently wants to know heart rate data of the user, and a priority level of information of the HRS service is raised.

In this embodiment of the present disclosure, the local device may monitor in real time a running status of a target application program corresponding to a target service, and if the running status of the target application program changes, sends a priority control instruction to the peer device, and the priority control instruction carries service identification information and a priority of the target service such that the peer device updates the priority of the target service. During specific implementation, if it is detected that the target application program corresponding to the target service is switched from background running to foreground running, the priority level of the target service is raised. If it is detected that the target application program corresponding to the target service is switched from foreground running to background running, the priority level of the target service is lowered.

For example, using the HRS as an example, it is assumed that a target application program corresponding to the HRS is A, a priority level corresponding to the HRS is "high", and the local device monitors a running status of the application program A. If learning that the application program A is switched from foreground running to background running, the local device sends a priority control instruction to the peer device, and the priority control instruction carries identification information and a target level of the HRS, and the target level may be set according to an actual requirement. For example, assuming that a current level is "high", the target level may be "low" or "intermediate". Correspondingly, if the application program A is switched from background running to foreground running, assuming that a current level is "low", the target level may be "high" or "intermediate". A specific manner is not limited in this embodiment of the present disclosure. For ease of description, it is assumed that the current level is "high", and the target level is "low". After receiving the priority control instruction, the peer device updates the priority level of the HRS from "high" to "low".

In this embodiment of the present disclosure, the local device may further monitor a display status of the local screen. If the display status changes, a quality of service (QoS) control instruction is sent to the local device, and the QoS control instruction carries identification information and a target level priority of a target service such that the local device updates a priority level of the target service to the target level. During specific implementation, if it is detected that the local screen is switched from an on state to a screen off state, the priority level of the target service is lowed. If it is detected that the local screen is switched from a screen off state to an on state, the priority level of the target service is raised.

For example, using the HRS as an example, assuming that a priority level corresponding to the HRS is "low", in a process in which the peer device transmits data to the local device, the local device monitors a display status of the local screen, and if learning that the screen is switched from an on state to a screen off state, sends a priority control instruction to the peer device, and the priority control instruction carries identification information and a target level of the HRS, and the target level may be set according to an actual requirement. For example, assuming that a current level is "high", the target level may be "low" or "intermediate". If it is detected that the local screen is switched from a screen off state to an on state, assuming that a current level is "low", the target level may be "high" or "intermediate". A specific manner is not limited in this embodiment of the present disclosure. For ease of description, it is assumed that the current level of the HRS is "high", and the target level is "low". After receiving the priority control instruction, the peer device updates the priority level of the HRS from "high" to "low". During specific implementation, after obtaining information such as the display status of the screen or a running status of an application program, the local device sends status information to the peer device such that the peer device updates the correspondence between a service type and a priority according to the status information, and the status information includes the information such as the display status of the local device and the running status of the application program.

In this embodiment of the present disclosure, the local device may further identify a current application scenario of a user according to a service data packet, and if a target level of a target service in the scenario is different from a current level of the service, sends a priority control instruction to the peer device such that the peer device adjusts the priority level of the service, to meets a user requirement. Certainly, during specific implementation, the peer device may identify a current application scenario of a user according to an obtained service data packet, and if a target level of a target service in the scenario is different from a current level of the service, updates the priority level of the target service.

For example, using the HRS as an example, as it is well known that heart rate data of people is generally 60 to 100 times/minute, if the local device parses out that heart rate data within a period of time is obviously above the data, the local device may identify that a user may be in a motion state. Therefore, the local device needs to send heart rate data to the peer device in real time. If a priority level corresponding to the HRS in a packet sent by the peer device is relatively low, the local device may control the peer device to raise the priority level corresponding to the HRS such that the peer device sends heart rate data to the local device the first time after obtaining the heart rate data.

In this way, priority levels of services can be updated according to a specific application scenario and user operation using the foregoing method, which can effectively reduce unnecessarily frequent transmission of data, reduce power consumption of the device, and prolong a service life of the device.

Figure 6A:
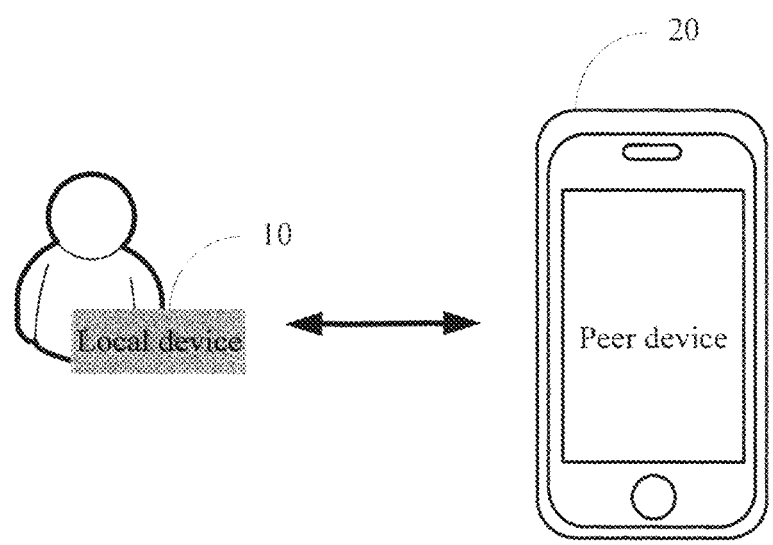
FIG. 6A is a schematic structural diagram of a system according to an embodiment of the present disclosure.
Figure 6B:
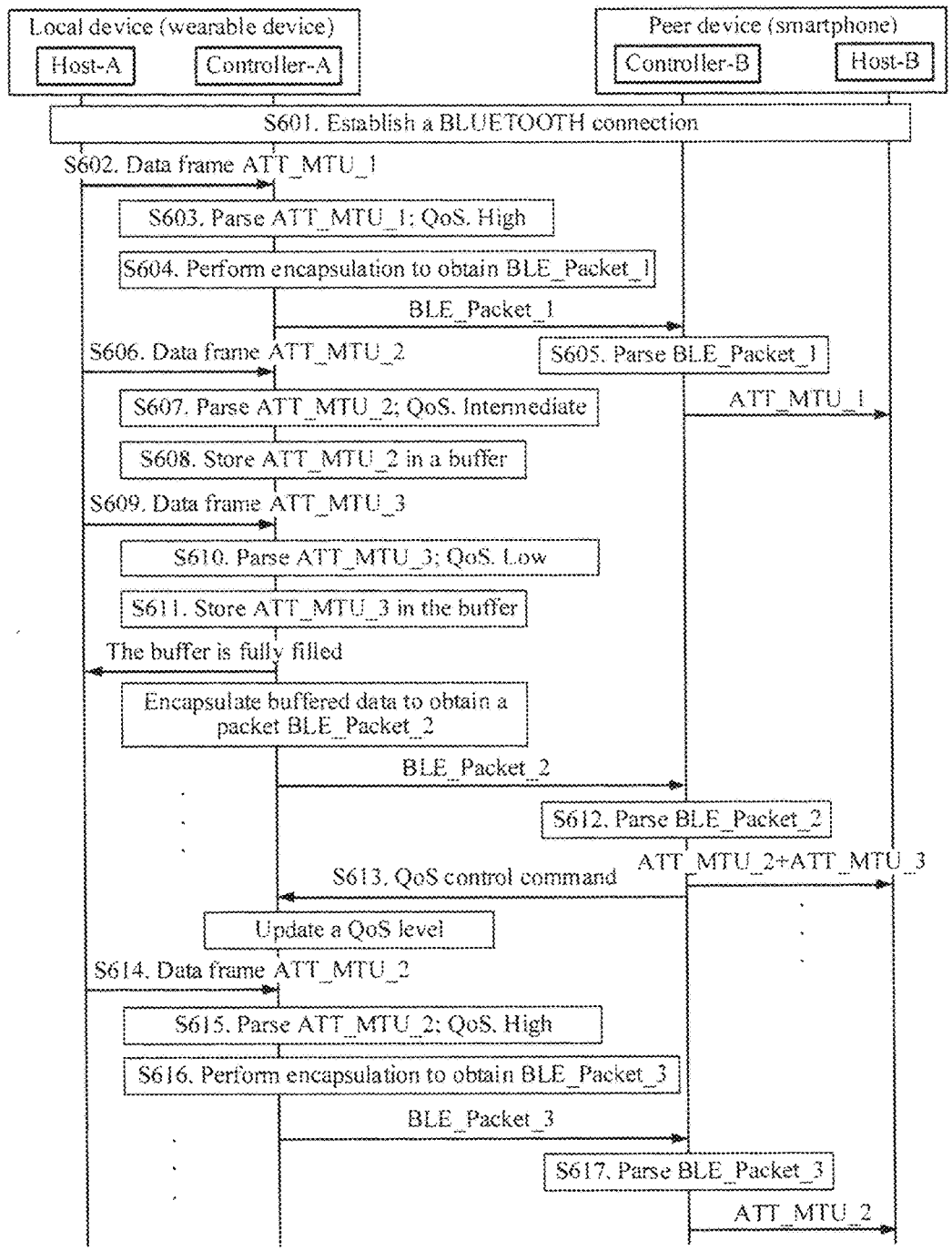
FIG. 6B is a schematic interaction diagram of a data transmission method according to an embodiment of the present disclosure.

For ease of understanding, the data transmission method provided in this embodiment of the present disclosure is described using a specific example, and in the specific example, data transmission of a BLE packet in a BLUETOOTH process is used as an example. Referring to FIG. 6A, FIG. 6A is a schematic structural diagram of a system according to an embodiment of the present disclosure. The system may include at least a local device 10 and a peer device 20. For the local device (sensor), a wearable device is used as an example, and for the peer device (collector), a smartphone is used as an example. Referring to FIG. 6B, FIG. 6B is a schematic interaction diagram of a data transmission method according to an embodiment of the present disclosure.

Step S601: A wearable device establishes a BLUETOOTH connection to a smartphone.

Usually, a BLUETOOTH device includes a BLUETOOTH host (Host) and a BLUETOOTH controller (Controller), the Host is mainly responsible for obtaining a service data packet, and the Controller is mainly responsible for receiving and sending a packet. The packet includes the service data packet obtained by the Host. Before data transmission, the BLUETOOTH device needs to establish a BLUETOOTH connection. First, the wearable device and the smartphone both enable a BLUETOOTH module. Herein, because relatively large differences exist between functions and degrees of intelligence of wearable devices, different wearable devices may have different discover, pairing, and connection establishment processes. The differences mainly lie in whether a screen is equipped. Using the application scenario described in this embodiment of the present disclosure, the wearable devices may include two types, a device having a screen and a device having no screen.

A discover, pairing, and connection establishment process of the device having a screen is similar to a process of establishing a BLUETOOTH connection between one mobile phone and another mobile phone. A specific process includes that the smartphone broadcasts a search message according to a given time period at a given frequency. After receiving the search message broadcast by the smartphone, the wearable device sends a search response message to the smartphone. The search response message carries a BLUETOOTH address and clock information of the BLUETOOTH module of the wearable device. After the smartphone receives the search response message of the wearable device, device discover is completed. In this case, a user may tap on the screen of the wearable device to establish a connection. The smartphone sends a BLUETOOTH address and a BLUETOOTH clock of the smartphone to the wearable device in order to synchronize clocks of the wearable device and the smartphone and establish a BLUETOOTH communications link between the wearable device and the smartphone, and the smartphone randomly generates a personal identification number (PIN) code, and sends the PIN code to the wearable device. After receiving the message, the wearable device displays the PIN code on a screen of a SMARTWATCH. The user may check whether the PIN codes are consistent on the screens of the smartphone and the wearable device in order to verify effectiveness of the connection. This is usually referred to as a "pairing" process. After the pairing process ends, the user chooses whether to accept or reject the BLUETOOTH connection on the wearable device. If yes, the BLUETOOTH connection is established between the smartphone and the wearable device, and data exchange can be performed between the two devices by means of BLUETOOTH.

In a pairing process of the wearable device having no screen, no PIN code needs to be transmitted. A specific process includes that there is a button on the wearable device. After a user presses the button, the wearable device enters a pairing time window, and within this time window, the wearable device listens to search messages sent from all BLUETOOTH devices, and returns search responses. In this case, the smartphone broadcasts a search message. After receiving the search message, the wearable device sends a search response message to the smartphone, and the search response message carries a BLUETOOTH address and clock information of the BLUETOOTH module of the wearable device. Then the smartphone sends a paging request to the wearable device, and the paging request carries a BLUETOOTH address and a clock message of the BLUETOOTH module of the smartphone in order to synchronize with a clock of the wearable device. In this way, a BLUETOOTH link is established between the smartphone and the wearable device, the smartphone sends a connection request to the wearable device, and the wearable device returns a connection response. Then data exchange can be performed between the two by means of BLUETOOTH. The foregoing process is completed within the pairing time window of the wearable device. Once the pairing time window ends, a SMARTBAND does not respond to any request, the connection establishment process also fails, and the foregoing process needs to be restarted.

It should be noted that, selection of a BLUETOOTH discover, pairing, and connection establishment manner is not determined by a type of a wearable device, but is related to a specific function configuration of the wearable device. For example, not all SMARTWATCHES are wearable smart devices that have a screen and have a relatively high degree of intelligence. For those SMARTWATCHES that do not have a screen or whose screens are configured only to display time, a BLUETOOTH discover, pairing, and connection establishment process is performed in the second manner. For those SMARTBANDs that have a relatively high degree of intelligence and have a screen, a BLUETOOTH discover, pairing, and connection establishment process is performed in the first manner.

Step S602: A BLUETOOTH host of the wearable device generates information data ATT_MTU_1 of a BLUETOOTH service #1, and sends the information data ATT_MTU_1 to a BLUETOOTH controller of the wearable device in order to send the information data ATT_MTU_1 to the peer smartphone.

The BLUETOOTH host of the wearable device generates the information data of the BLUETOOTH service #1. A manner of generating information data of a BLUETOOTH service is related to a property of the corresponding BLUETOOTH service. Generally, if the corresponding BLUETOOTH service is a motion and health service, for example, an HRS, a BLS, a GLS, an HTS, or an RSCS, a corresponding sensing device needs to be disposed on the wearable device to obtain service data. Therefore, a manner of generating information data of a BLUETOOTH service of such a type includes a processor in the wearable device receives original data generated by a sensor, a series of operation processing such as data noise reduction, data transformation, and data encoding are performed in the processor in order to generate processed data, and the processed data is transmitted to the BLUETOOTH host. In the BLUETOOTH host, frame format transformation is performed on the data processed by the processor such that the data is transformed into a data structure that can be read by a BLUETOOTH device supporting the BLUETOOTH service #1, that is, information data of the BLUETOOTH service #1 (that is, a service data packet in the foregoing embodiment. For ease of description, an example in which the service data packet includes a priority is used). Because information data processing in the BLUETOOTH host is all completed based on the Attribute Protocol (ATT), the generated information data of the BLUETOOTH service #1 is loaded into ATT_MTU and transmitted to the BLUETOOTH controller. The information data of the BLUETOOTH service #1 is recorded as ATT_MTU_1. Similarly, if the corresponding BLUETOOTH service is a service related to an attribute and a status of the wearable device, such as a CTS or a DIS, original data of the service is directly generated in the processor, and in the BLUETOOTH host, frame format transformation is performed on the generated data such that the data is transformed into a data structure that can be read by the BLUETOOTH device supporting the BLUETOOTH service #1, that is, information data of the BLUETOOTH service #1—ATT_MTU_1. If the corresponding BLUETOOTH service is an alert service such as an ANS or an IAS, original data of the corresponding BLUETOOTH service #1 is also directly generated in the processor. The processor monitors in real time a trigger condition of sending alert information, and once the trigger condition is met, generates original data, and transmits the original data to the BLUETOOTH host, and in the BLUETOOTH host, frame format transformation is performed on the generated data such that the data is transformed into a data structure that can be read by the BLUETOOTH device supporting the BLUETOOTH service #1, that is, information data of the BLUETOOTH service #1—ATT_MTU_1.

After generating the information data ATT_MTU_1 of the BLUETOOTH service #1, the BLUETOOTH host of the wearable device transfers ATT_MTU_1 to the BLUETOOTH controller of the wearable device using a host controller interface (HCI) in order to send ATT_MTU_1 to the peer smartphone.

Step S603: The BLUETOOTH controller of the wearable device receives the information data ATT_MTU_1 of the BLUETOOTH service #1, and parses out a priority level of the data ATT_MTU_1.

The information data ATT_MTU_1 of the BLUETOOTH service #1 carries priority level information of the information data. A priority is an index for measuring a degree of importance and a degree of urgency of a data packet. A higher priority level indicates that a packet corresponding to information data has a higher degree of importance and a higher degree of urgency, and has a higher transmission latency requirement, and the corresponding data needs to be sent the first time. On the contrary, a lower priority level indicates that a packet corresponding to information data has a lower degree of importance and a lower degree of urgency, and is highly tolerant of a transmission latency. The priority level may be represented in a form of a value. For example, a priority level range is set to 0 to 100, 0 represents a lowest priority level, and 100 represents a highest priority level. Alternatively, the priority level may be represented in a form of a "level". For example, priorities are set to three levels, "high" (High), "intermediate" (Intermediate), and "low" (Low). In this embodiment of the present disclosure, the priority level is represented in the second form.

After receiving the information data ATT_MTU_1 of the BLUETOOTH service #1, the BLUETOOTH controller of the wearable device parses out fields in the ATT_MTU_1 packet, including a field supporting a priority level of the ATT_MTU_1 packet, and learns that the priority level of ATT_MTU_1 is "high" (High).

Step S604: Perform encapsulation to obtain BLE_Packet_1. The BLUETOOTH controller of the wearable device determines, according to the priority level of the information data ATT_MTU_1 of the BLUETOOTH service #1, a manner of sending the information data of the BLUETOOTH service #1.

In this embodiment of the present disclosure, two BLUETOOTH packet sending manners are set in total. One is directly encapsulating the information data of the BLUETOOTH service into a BLE packet, and sending the encapsulated BLE packet to the peer smartphone. A short time elapses from generating to sending the information data of the BLUETOOTH service, but a length of a payload loaded into the BLE packet is short. This sending manner is applicable to service information data that has a relatively high priority level and is relatively sensitive about a transmission latency. The other is first storing the information data of the BLUETOOTH service in a sending buffer of the BLUETOOTH controller (that is, the packet buffer described in the foregoing embodiment), adding a preset separator at the end of the information data in order to separate information data of different BLUETOOTH services, and when an amount of data in the sending buffer reaches or exceeds a given threshold, all the data in the sending buffer is loaded into a payload of a BLE packet, and encapsulated into the BLE packet and sent. A stage of storage in the sending buffer is included within the time from generating to sending the BLUETOOTH information data, and therefore, a system latency is relatively long, but a length of the valid payload in the BLE packet is relatively large, and transmission efficiency is improved and power consumption is lowered. Therefore, this manner is applicable to service information data that has a relatively low priority level requirement and is relatively insensitive about a transmission latency. This step includes determining a sending manner used by the BLUETOOTH controller, and a determining basis is the priority level of the to-be-sent information data. Specific implementation is as follows.

First, a system sets a threshold about the priority level of the information data of the BLUETOOTH service. If the priority level of the information data is higher than the threshold, the BLUETOOTH controller uses the first sending manner to encapsulate and send the BLE packet. If the priority level of the information data is lower than the threshold, the BLUETOOTH controller uses the second sending manner to encapsulate and send the BLE packet. In this embodiment of the present disclosure, because priorities of information data of BLUETOOTH services are represented by three levels "high", "intermediate", and "low", the threshold that is set is also a level. That is, in this embodiment of the present disclosure, a priority level threshold setting rule includes that if the priority level of the information data of the BLUETOOTH service is "high", the first sending manner is used. If the priority level of the information data of the BLUETOOTH service is "intermediate" or "low", the second sending manner is used. Herein, it should be noted that, the priority level threshold is not set fixed, but is continuously changed and adjusted according to an actual status and an actual requirement of a user. In this embodiment of the present disclosure, it can be known from step S603 that, the priority level of the information data of the BLUETOOTH service #1 is "high". Therefore, it is determined that the first sending manner is used. The BLUETOOTH controller directly encapsulates the information data ATT_MTU_1 of the BLUETOOTH service #1 into a BLE packet as a valid payload of the BLE packet. The generated BLE packet is BLE_Packet_1, and the BLUETOOTH controller directly sends the BLE_Packet_1 packet to the smartphone. After receiving the BLE_Packet_1 packet, the smartphone parses out the valid payload—ATT_MTU_1, and transmits ATT_MTU_1 from a BLUETOOTH controller of the smartphone to a BLUETOOTH host of the smartphone.

Step S605: A controller of the smartphone receives a BLUETOOTH packet BLE_Packet_1, parses out the information data ATT_MTU_1 of the BLUETOOTH service #1, and reports the information data to a host of the smartphone.

In this embodiment of the present disclosure, after the controller of the smartphone receives the BLE packet, BLE_Packet_1, because the payload of BLE_Packet_1 includes only the information data ATT_MTU_1 of the BLUETOOTH service #1, in a parsing process, the information data ATT_MTU_1 of the BLUETOOTH service #1 can be obtained by parsing out only the payload of BLE_Packet_1, and the controller of the smartphone directly reports ATT_MTU_1 to the host of the smartphone.

Step S606: The BLUETOOTH host of the wearable device generates information data ATT_MTU_2 of a BLUETOOTH service #2, and sends the information data ATT_MTU_2 to the BLUETOOTH controller of the wearable device in order to send the information data ATT_MTU_2 to the peer smartphone.

After generating the information data ATT_MTU_2 of the BLUETOOTH service #2, the BLUETOOTH host of the wearable device transfers ATT_MTU_2 to the BLUETOOTH controller of the wearable device using the HCI in order to send ATT_MTU_2 to the peer smartphone. For a specific process, refer to step S602 in this embodiment of the present disclosure.

Step S607: The BLUETOOTH controller of the wearable device receives the information data ATT_MTU_2 of the BLUETOOTH service #2, and parses out a priority level of the data ATT_MTU_2.

After receiving the information data ATT_MTU_2 of the BLUETOOTH service #2, the BLUETOOTH controller of the wearable device parses out fields in the ATT_MTU_2 packet, including a field supporting a priority level of the ATT_MTU_2 packet, and learns that the priority level of ATT_MTU_2 is "intermediate" (Intermediate). For a specific process, refer to step S603 in this embodiment of the present disclosure.

Step S608: Store ATT_MTU_2 in a buffer. The BLUETOOTH controller of the wearable device determines, according to the priority level of the information data ATT_MTU_2 of the BLUETOOTH service #2, a manner of sending the information data of the BLUETOOTH service #2.

In this embodiment of the present disclosure, it can be known from step S607 that, the priority level of the information data of the BLUETOOTH service #2 is "intermediate". Therefore, it is determined that the second sending manner is used. The host of the wearable device stores the information data ATT_MTU_2 of the BLUETOOTH service #2 in the sending buffer of the controller of the wearable device (that is, the packet buffer in the foregoing embodiment), and adds a separator at the end or beginning of the data ATT_MTU_2. The separator is a binary digital sequence having a particular length in order to distinguish information data of different BLUETOOTH services, and is a segmentation point of two adjacent pieces of service information data. The separator is preferably a character or binary sequence that does not appear in BLUETOOTH service information, and is generally a character string that is forbidden in BLUETOOTH service information or a character string that barely appears in BLUETOOTH service information, for example, a string of "0" or a string of "1". A length of the separator is set by the system, for example, 8 bits or 16 bits. After the separator is added, the BLUETOOTH controller of the wearable device determines whether an amount of data in the sending buffer exceeds a length threshold that is set, to determine whether a payload length of a BLE packet that is to be encapsulated and transmitted is close to or reaches a maximum payload length stipulated by the BT SIG—255 octets. Usually, because a data overflow problem occurs after the sending buffer is fully filled, the length threshold that is set needs to be lower than the maximum payload length 255 octets. However, if the length threshold is set excessively low, the payload length of the BLE packet obtained through encapsulation is affected, failing to improve data transmission efficiency and reduce power consumption. Therefore, the length threshold for determining needs to be set close to the maximum payload length 255 octets stipulated by the BT SIG, for example, 200 octets or 210 octets. If the amount of data in the sending buffer is greater than the length that is set, the data in the sending buffer is encapsulated into a payload of a BLE packet, and sent together with the BLE packet to the peer smartphone. If the amount of data in the sending buffer is less than the length that is set, sending waits such that subsequent information data of another BLUETOOTH service is filled in the sending buffer, and the controller of the wearable device monitors in real time whether an amount of data in the sending buffer is greater than the length threshold that is set. In this embodiment of the present disclosure, after the information data ATT_MTU_2 of the BLUETOOTH service #2 is added to the sending buffer and the separator is added at the end of the data, the amount of data in the sending buffer has not exceeded the preset length threshold. Therefore, sending of ATT_MTU_2 waits.

Step S609: The BLUETOOTH host of the wearable device generates information data ATT_MTU_3 of a BLUETOOTH service #3, and sends the information data to the BLUETOOTH controller of the wearable device in order to send the information data to the peer smartphone.

After generating the information data ATT_MTU_3 of the BLUETOOTH service #3, the BLUETOOTH host of the wearable device transfers ATT_MTU_3 to the BLUETOOTH controller of the wearable device using the HCI, to send ATT_MTU_3 to the peer smartphone. For a specific process, refer to step S602 in this embodiment of the present disclosure.

Step S610: The BLUETOOTH controller of the wearable device receives the information data ATT_MTU_3 of the BLUETOOTH service #3, and parses out a priority level of the data ATT_MTU_3.

After receiving the information data ATT_MTU_3 of the BLUETOOTH service #3, the BLUETOOTH controller of the wearable device parses out fields in the ATT_MTU_3 packet, including a field supporting a priority level of the ATT_MTU_3 packet, and learns that the priority level of ATT_MTU_3 is "low" (Low). For a specific process, refer to step S603 in this embodiment of the present disclosure.

Step S611: Store ATT_MTU_3 in the buffer. The BLUETOOTH controller of the wearable device determines, according to the priority level of the information data ATT_MTU_3 of the BLUETOOTH service #3, a manner of sending the information data of the BLUETOOTH service #3.

In this embodiment of the present disclosure, it can be known from step S610 that, the priority level of the information data of the BLUETOOTH service #3 is "low". Therefore, it is determined that the second sending manner is used. The host of the wearable device stores the information data ATT_MTU_3 of the BLUETOOTH service #3 in the sending buffer of the controller of the wearable device, and adds a separator at the end of the data ATT_MTU_3. In this embodiment of the present disclosure, ATT_MTU_3 is stored in the sending buffer of the controller of the wearable device after ATT_MTU_2, and the sending buffer includes ATT_MTU_2, ATT_MTU_3, and two separators in total. The BLUETOOTH controller of the wearable device monitors whether an amount of data in the sending buffer is greater than the length threshold that is set. In this embodiment of the present disclosure, after the information data ATT_MTU_3 of the BLUETOOTH service #3 is stored in the sending buffer and the separator is added at the end of the data, the amount of data in the entire sending buffer (ATT_MTU_2+ATT_MTU_3+two separators) exceeds the preset length threshold. Therefore, the data in the sending buffer is encapsulated into a valid payload of a BLE packet. The generated BLE packet is recorded as BLE_Packet_2, BLE_Packet_2 is sent to the peer smartphone, and the sending buffer is cleared. Before the BLUETOOTH controller of the wearable device clears the sending buffer, the BLUETOOTH controller sends a control command to the BLUETOOTH host in order to command the BLUETOOTH host to stop inputting information data to the sending buffer of the BLUETOOTH controller.

Step S612: The controller of the smartphone receives a BLUETOOTH packet BLE_Packet_2, parses out the information data ATT_MTU_2 of the BLUETOOTH service #2 and the information data ATT_MTU_3 of the BLUETOOTH service #3, and reports the information data to the host of the smartphone.

In this embodiment of the present disclosure, after the controller of the smartphone receives the BLE packet, BLE_Packet_2, because the payload of BLE_Packet_2 includes the information data ATT_MTU_2 of the BLUETOOTH service #2, the information data ATT_MTU_3 of the BLUETOOTH service #3, and two separators, in a parsing process, information data of the two BLUETOOTH services ATT_MTU_2 and ATT_MTU_3 in the payload of BLE_Packet_2 can be parsed out by first parsing out the separators in the payload of BLE_Packet_2. Then the controller of the smartphone directly reports ATT_MTU_2 and ATT_MTU_3 to the host of the smartphone.

Step S613: The smartphone sends a QoS control command to the wearable device in order to adjust the priority level of the BLUETOOTH service #2.

In this embodiment of the present disclosure, the priority level of the BLUETOOTH service #2 is initially "intermediate" (Intermediate). The priority level of the BLUETOOTH service may be adjusted by the smartphone (collector). In an implementation solution of the present disclosure, it is mainly considered that the collector dynamically adjusts a priority level of information data of a BLUETOOTH GATT service according to two factors, an application scenario and a user operation.

Application scenario: Using an HRS as an example, the HRS service may be applied to different application scenarios, for example, running and sleep monitoring. When in a running scenario, motion parameters and physiological indexes (including a heart rate) measured by a Sensor need to be displayed on the collector in real time such that a user learns a physiological index change and a motion effect of the user in real time. Therefore, the user has a relatively high QoS requirement on information data of the HRS service such that heart rate data can be updated and presented in real time. However, if the HRS service is applied to a sleep monitoring scenario, because the user is asleep, heart rate data is mainly used to determine sleep quality of the user and monitor whether the user enters a deep sleep, in this case, it is not necessary to transmit the heart rate data to the collector in real time. Therefore, information data of the HRS service has a relatively low transmission latency requirement. Priorities of a same BLUETOOTH GATT service in different application scenarios are adjusted, which are mainly indicated in running of different application programs in the smartphone. Still using the HRS service as an example, usually, multiple application programs are installed in the smartphone. An application program A is responsible for measuring and monitoring a motion status of a user, and another application program B is responsible for monitoring sleep quality of the user. Therefore, when the smartphone runs the application program A, it is considered that the smartphone is currently in an application scenario of running or motion. If the smartphone runs the application program B, it is considered that the smartphone is currently in an application scenario of sleep monitoring.

User operation: A user operation often reflects an intention of a user. Still using the HRS as an example, the Sensor obtains heart rate data using a heart rate sensor and transmits the heart rate data to the collector, and the user may open a corresponding application program in the collector to view the heart rate data of the user. When the collector is in a screen off state, or the corresponding application is in a background running state, it indicates that the user currently does not want to know heart rate data of the user, and a priority level of information data of the HRS service is lowered. However, when a screen of the collector is on, and the corresponding application is switched to foreground running, it indicates that the user currently wants to know heart rate data of the user, and a priority level of information of the HRS service is raised.

In this embodiment of the present disclosure, because an application scenario or a user operation changes, the smartphone needs to adjust the priority level of the information data of the BLUETOOTH service #2, and adjusts the original "intermediate" to "high". A specific implementation manner includes that the BLUETOOTH host of the smartphone generates a control command of adjusting the priority of ATT_MTU_2, and transmits the control command to the BLUETOOTH controller of the smartphone using the HCI interface. The BLUETOOTH controller encapsulates the command into a BLE packet, and adds an adjusted priority level of ATT_MTU_2 to the packet. The BLUETOOTH controller of the wearable device receives the packet, parses out the control command, and reports the control command to the BLUETOOTH host in order to complete adjusting the priority level of the information data ATT_MTU_2 of the BLUETOOTH service #2.

Step S614: The BLUETOOTH host of the wearable device generates information data ATT_MTU_2 of the BLUETOOTH service #2, and sends the information data to the BLUETOOTH controller of the wearable device in order to send the information data to the peer smartphone.

For a specific process, refer to step S606 in this embodiment of the present disclosure.

Step S615: The BLUETOOTH controller of the wearable device receives the information data ATT_MTU_2 of the BLUETOOTH service #2, and parses out a priority level of the data ATT_MTU_2.

For a specific process, refer to step S607 in this embodiment of the present disclosure.

In this embodiment of the present disclosure, because the smartphone has adjusted the priority level of the information data ATT_MTU_2, the priority level of ATT_MTU_2 that is parsed out by the BLUETOOTH controller of the wearable device is "high" (High).

Step S616: Perform encapsulation to obtain BLE_Packet_3. The BLUETOOTH controller of the wearable device determines, according to the priority level of the information data ATT_MTU_2 of the BLUETOOTH service #2, a manner of sending the information data of the BLUETOOTH service #2.

The priority level of the information data ATT_MTU_2 has been adjusted to "high" in step S613. In this embodiment of the present disclosure, it can be known from an output result of step S615 that the priority level of the information data of the BLUETOOTH service #2 is "high". Therefore, it is determined that the first sending manner is used. The BLUETOOTH controller directly encapsulates the information data ATT_MTU_2 of the BLUETOOTH service #2 into a BLE packet as a valid payload of the BLE packet. The generated BLE packet is BLE_Packet_3, and the BLUETOOTH controller directly sends the BLE_Packet_3 packet to the smartphone. After receiving the BLE_Packet_3 packet, the smartphone parses out the valid payload—ATT_MTU_2, and transmits ATT_MTU_2 from the BLUETOOTH controller of the smartphone to the BLUETOOTH host of the smartphone.

Step S617: The controller of the smartphone receives a BLUETOOTH packet BLE_Packet_3, parses out the information data ATT_MTU_2 of the BLUETOOTH service #1, and reports the information data to the host of the smartphone.

Figure 6C:
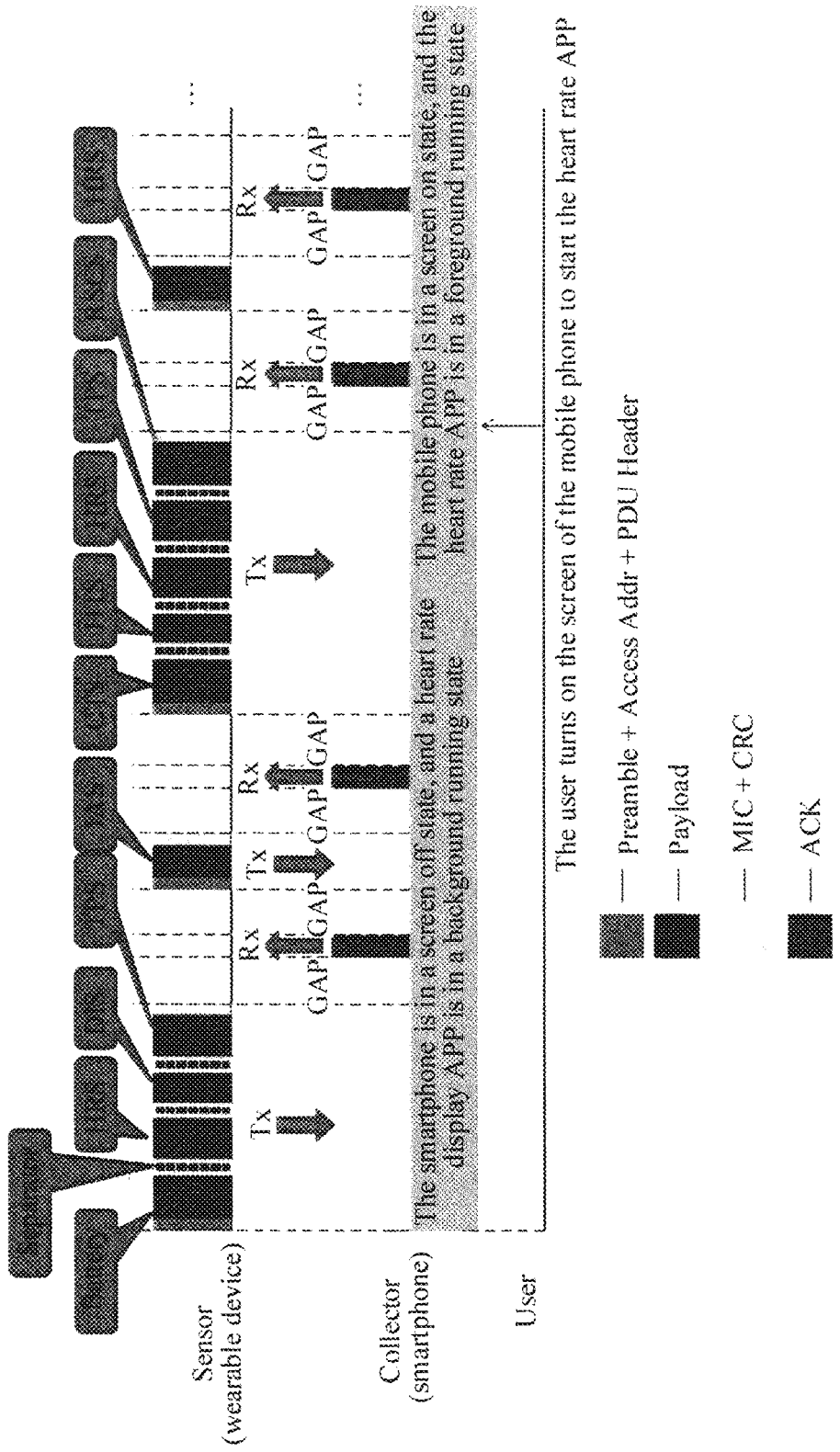
FIG. 6C is a schematic diagram of a packet structure in a data exchange process according to FIG. 6A.

To further describe the data exchange process, referring to FIG. 6C, FIG. 6C is a schematic diagram of a packet structure in a data exchange process according to FIG. 6A.

As shown in FIG. 6C, the first BLE packet sent by the wearable device to the smartphone includes ATT_MTU of four BLUETOOTH GATT services, a BAS, an HRS, a DIS, and a TPS. Priority levels of information data of the four BLUETOOTH services are all relatively low, and it is determined that the second sending manner is used for sending. Therefore, ATT_MTU of the four services is stored in the sending buffer, and when an amount of data stored in the sending buffer reaches or exceeds the threshold that is set, the data is encapsulated into a payload of a BLE packet and sent to the peer smartphone. In this way, the first BLE packet is generated. The second BLE packet sent by the wearable device to the smartphone includes ATT_MTU of only one BLUETOOTH GATT service, that is, an IAS. A priority level of information data of the service is relatively high, and it is determined that the first sending manner is used for sending, that is, the information data is directly encapsulated into a BLE packet and sent to the peer smartphone. The third BLE packet has a generation and sending manner consistent with that of the first BLE packet. The packet includes ATT_MTU of five BLUETOOTH services in total a CTS, an HTS, the HRS, the TPS, and an RSCS. The fourth BLE packet carries ATT_MTU of only one BLUETOOTH GATT service, that is, the HRS. This is because a status of the smartphone changes. An original mobile phone screen off state is changed to a mobile phone screen on state, or a heart rate display application is switched from an original background running state to a foreground running state. Therefore, a priority level of information data of the HRS service changes, and is raised. Therefore, a sending manner for the HRS service is changed to the first sending manner.

The following describes apparatus embodiments of the present disclosure. The apparatus embodiments of the present disclosure belong to a conception the same as that of the method embodiments of the present disclosure, and are used to execute the methods described in the method embodiments of the present disclosure. For ease of description, the apparatus embodiments of the present disclosure describe only parts related to the apparatus embodiments of the present disclosure. For specific technical details that are not disclosed, refer to the description of the method embodiments of the present disclosure, which are not described herein again.

Figure 7:
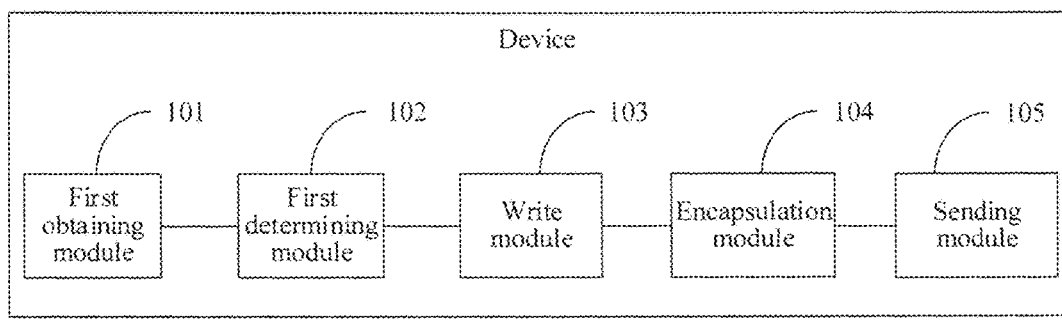
FIG. 7 is a schematic structural diagram of a device according to an embodiment of the present disclosure.

Referring to FIG. 7, FIG. 7 is a schematic structural diagram of a device according to an embodiment of the present disclosure. In this embodiment of the present disclosure, the device corresponds to the first method embodiment to the third method embodiment, and may include a first obtaining module 101, a first determining module 102, a write module 103, an encapsulation module 104, and a sending module 105, where the first obtaining module 101 is configured to obtain a service data packet that needs to be sent to a peer device. The first determining module 102 is configured to determine a priority corresponding to the service data packet. The write module 103 is configured to write the service data packet to a packet buffer if the priority is lower than a preset level. The encapsulation module 104 is configured to encapsulate the data stored in the packet buffer in order to generate a to-be-sent packet when data stored in the packet buffer meets a transmission condition, and the sending module 105 is configured to send the to-be-sent packet to the peer device.

In the device described in this embodiment of the present disclosure, when a service data packet that needs to be sent to a peer device is obtained, a priority corresponding to the service data packet is determined. The to-be-sent service data packet is written to a packet buffer if the priority is lower than a preset level. The data stored in the packet buffer is encapsulated in order to generate a to-be-sent packet when data stored in the packet buffer meets a transmission condition, and the generated to-be-sent packet is sent to the peer device. By means of this embodiment of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

Figure 8A:
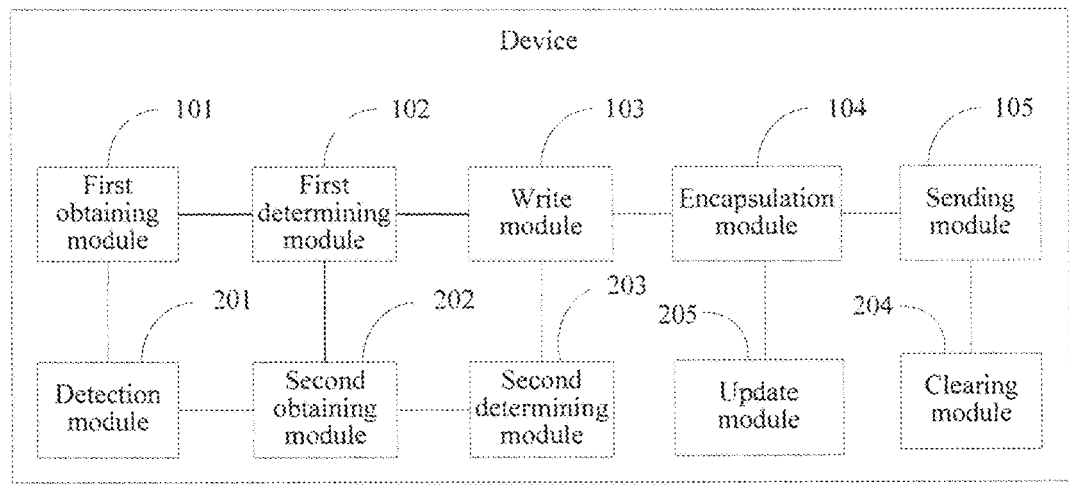
FIG. 8A is another schematic structural diagram of a device according to an embodiment of the present disclosure.

Referring to FIG. 8A, FIG. 8A is another schematic structural diagram of a device according to an embodiment of the present disclosure. In this embodiment of the present disclosure, the device corresponds to the first method embodiment to the third method embodiment, and besides the first obtaining module 101, the first determining module 102, the write module 103, the encapsulation module 104, and the sending module 105 in the foregoing embodiment, may further include a detection module 201, a second obtaining module 202, a second determining module 203, a clearing module 204, and an update module 205.

Figure 8B:
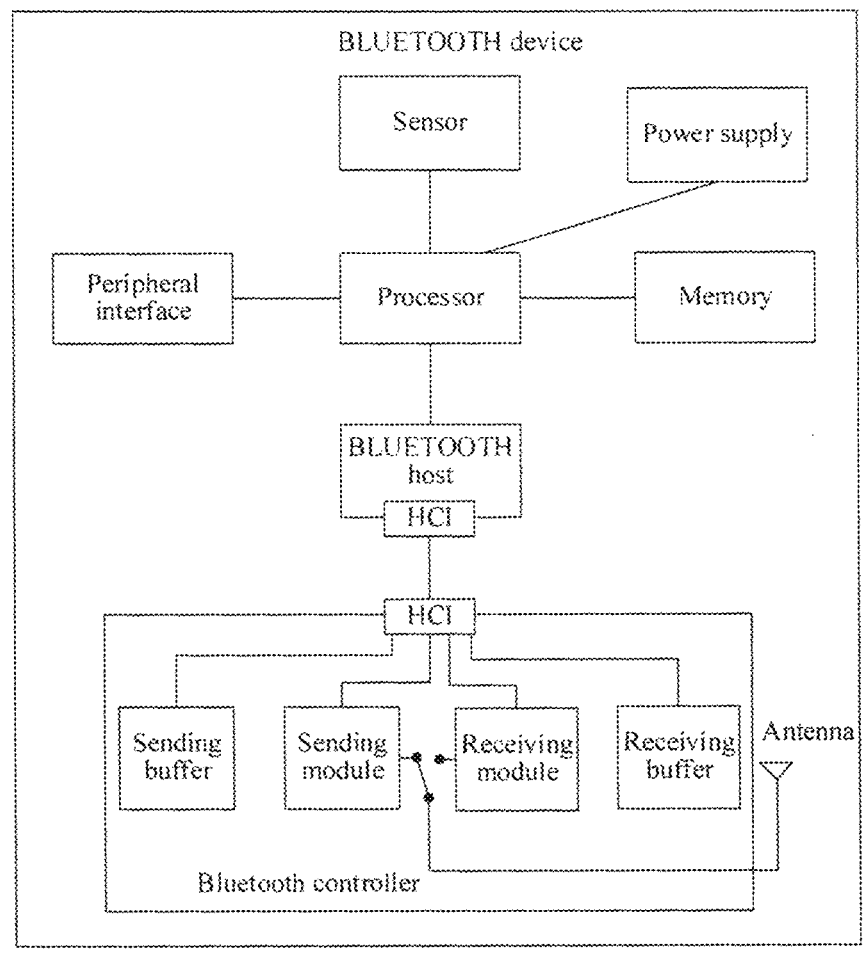
FIG. 8B is a schematic structural diagram of a BLUETOOTH device according to FIG. 8A.

For ease of understanding, a BLUETOOTH device is used as example, and a structure of the BLUETOOTH device is given, which may be shown in FIG. 8B. FIG. 8B is a schematic structural diagram of a BLUETOOTH device according to FIG. 8A. The local device (for example, the wearable device) and the peer device (for example, the smartphone) in the foregoing embodiment may be the BLUETOOTH device shown in FIG. 8B, or may be another device, which is not limited in this embodiment of the present disclosure, but for ease of description, the BLUETOOTH device is used as an example.

As shown in FIG. 8B, the BLUETOOTH device may include components such as a sensor, a processor, a peripheral interface, a memory, a BLUETOOTH host, a BLUETOOTH controller, and a power supply, and the BLUETOOTH controller may include components such as a sending buffer, a sending module, a receiving buffer, a receiving module, and an antenna. These components communicate using one or more buses, and data exchange is performed between the BLUETOOTH host and the BLUETOOTH controller using an HCI. A person skilled in the art may understand that, the structure of the BLUETOOTH device shown in the figure constitutes no limitation to the present disclosure, and may be a bus type structure or may be a star type structure, and may include more or fewer components than those shown in the figure, or some components may be combined, or a different component deployment may be used. In the foregoing implementation manner, the local device (for example, the wearable device) includes but not limited to SMARTGLASSES, a SMARTWATCH, a SMARTBAND, a smart headset, a smart hanging, a smartring, an electronic device integrated into clothes/trousers/shoes/socks/a helmet/a cap, a weighting scale, a blood pressure gauge, a glucometer, a heart rate meter, and the like, and a combination of two or more of the foregoing.

The sensor is configured to control and manage working of one or more sensing devices integrated in an electronic device, and process sensed data collected and generated by the sensing devices. In some specific implementation manners of the present disclosure, the sensor is integrated with sensing devices of various types, for example, a Hall component configured to detect a physical quantity of the electronic device, such as a force, a torque, a pressure, a stress, a location, a displacement, a speed, an acceleration, an angle, an angular velocity, a quantity of revolutions, a rotational speed, and a time at which a working status changes, and convert the physical quantity into an electric quantity to perform detection and control, or a sensing device configured to detect a physiological index of a human body or an animal, for example, a dedicated or multipurpose sensor for detecting a heart rate, a blood pressure, a glucose, a blood lipid, a body temperature, a height, a weight, a running speed, a stride, an electrocardiosignal, a fingerprint, a voice print, and an iris, and convert the detected physiological index into an electrical signal to perform detection and control, or a sensing device configured to detect an environmental index data, for example, a dedicated or multipurpose sensor for detecting a barometric pressure, an altitude, a temperature, a humidity, a wind speed, a wind direction, and an orientation, and convert the detected environment data into an electrical signal to perform detection and control. Some other sensing devices may further include a gravity sensor, a tri-axis accelerometer, a gyroscope, and the like. The sensing device may be a discrete independent device, or may be an integrated sensing device integrated on a chip or a board.

The processor is a control center of the electronic device, which uses various interfaces and lines to connect to parts of the entire electronic device, and executes various functions and/or data processing of the electronic device by running or executing a software program and/or module stored in a storage unit and invoking data stored in the storage unit. The processor may include an integrated circuit (IC), for example, may include a single packaged IC, or may include multiple successive packaged ICs that have same functions or different functions. For example, the processor may include only a central processing unit (CPU), or may be a combination of a graphics processing unit (GPU), a digital signal processor (DSP), and a control chip (for example, a baseband chip) or a field programmable gate array (FPGA) in a communications unit. In a specific implementation manner of the present disclosure, the CPU may be a single computing core or may include multiple computing cores.

The memory may be configured to store a software program and module. The processor runs the software program and module that are stored in the memory in order to implement various functional applications of the electronic device and implement data processing. The memory mainly includes a program storage area and a data storage area. The program storage area may store an operating system, an application program required by at least one function, such as a sound play program and an image display program. The data storage area may store data (such as audio data and an address book) created according to use of the electronic device and the like. In a specific implementation manner of the present disclosure, the memory may include a nonvolatile random access memory (NVRAM), a phase change random access memory (PRAM), or a magnetoresistive random access memory (MRAM), and may further include a nonvolatile memory, for example, at least one magnetic storage device, an electrically erasable programmable read-only memory (EEPROM), or a flash memory, for example, an NOR flash memory or an NAND flash memory. The nonvolatile memory stores an operating system and an application program that are executed by a processing module. The processor loads a running program and data from the nonvolatile memory to a memory, and stores digital content in a large scale storage apparatus. The operating system is used for control and management of conventional system tasks, such as memory management, storage device control, and power management, and various components and/or drivers that facilitate communication between various types of software and hardware. In this implementation manner of the present disclosure, the operating system may be the ANDROID operating system of the GOOGLE Incorporated, the iOS operating system developed by the APPLE Incorporated, or the WINDOWS operating system developed by the MICROSOFT Corporation, or an embedded operating system such as VSWORKS. The application program includes any application installed in the electronic device, and includes but not limited to a browser, an electronic mail (E-mail), an instant messaging service, text processing, keyboard virtualization, a window widget, encryption, digital rights management, voice recognition, voice replication, positioning (for example, a function provided by a global positioning system), music play, and the like.

The peripheral interface is an interface configured to connect an external device to the electronic device. The external device includes but not limited one or more of a keyboard, a mouse, a touch panel, a track ball, a joystick, a game controller, a microphone, a display, a sound box, or a power amplifier. The external device is connected to the processor of the electronic device using the peripheral interface, inputs data (for example, digit or character information) to the processor for processing or reads data from the processor, and outputs data to the external device using the peripheral interface. The peripheral interface includes but not limited to a USB interface, a mini USB interface, a peripheral component interconnect (PCI), The Institute of Electrical and Electronics Engineers (IEEE) 1394 interface, a video graphics array (VGA) interface, a high definition multimedia interface (HDMI), and the like, or a combination of one or more of the foregoing interfaces.

The BLUETOOTH host is configured to process BLUETOOTH upper layer protocol data exchange. The BLUETOOTH upper layer protocol includes the Logical Link Control & Adaptation Protocol (L2CAP), the Service Discovery Protocol (SDP), the Generic Access Profile (GAP), the ATT, and the GATT. An upper layer application service based on the GATT protocol includes but not limited to an HRS, a BLS, a GLS, a cycling speed and cadence service (CSCS), an RSCS, an HTS, an ANS, an IAS, a BAS, a CTS, a DIS, an LLS, an LNS, a TPS, and the like. The BLUETOOTH host is connected to the BLUETOOTH controller using the HCI, and configured to control the BLUETOOTH controller, which includes establishing/disrupting a BLU- ETOOTH link, adjusting transmit power of a BLUETOOTH signal, adjusting a device role of the BLUETOOTH device, adjusting a status of the BLUETOOTH device, maintaining a BLUETOOTH link, and the like. The BLUETOOTH host may further receive status information from the BLUETOOTH controller using the HCI. The BLUETOOTH host is also connected to the processor, and may transfer data from the BLUETOOTH controller to the processor for operation processing, and may also transfer data generated by the processor to the BLUETOOTH processor using the HCI in order to send the data to the BLUETOOTH link.

The BLUETOOTH controller is configured to process BLUETOOTH lower layer protocol data exchange, and mainly processes BLUETOOTH signal sending and receiving. The BLUETOOTH lower layer protocol includes the Link Management Protocol (LMP), the Link Layer (LL) protocol, and the Radio Frequency (RF) protocol. The LMP is responsible for LL establishment, operation, and maintenance. The LL is responsible for BLUETOOTH/BLE packet encapsulation, delivery, and receiving. The RF layer includes a transmitting module and a receiving module, the transmitting module and the receiving module share a set of radio frequency transceiver apparatuses and antennas, and whether to send a signal or receive a signal is determined in a time division manner, that is, at a time, the RF layer can only transmit a BLUETOOTH signal or a receive a BLUETOOTH signal. Besides the HCI interface for communicating with the BLUETOOTH host, the BLUETOOTH controller further includes four components a sending module, a sending buffer, a receiving module, and a receiving buffer.

The sending module is configured to generate a BLUETOOTH packet, convert the BLUETOOTH packet into an analog signal, modulate a to-be-sent baseband signal to a selected RF by means of a series of steps such as digital to analog conversion (D\A), amplification, filtering, rectification, intermediate frequency modulation, and RF modulation, and send the signal using an antenna.

The sending buffer is configured to temporarily store to-be-sent information data. The data in the sending buffer may be transferred to the sending module using the bus or another internal interface. The sending module uses the received information data as a payload of a BLUETOOTH packet, adds fields such as a preamble, an access address, and a payload header at the beginning of the information data, adds field such as a MIC and a CRC at the end of the information data, and encapsulates the information data into the BLUETOOTH packet. The sending buffer may be cleared at any time. Once the buffer is fully filled with data, data that first enters the sending buffer overflows.

The receiving module is configured to receives the BLUETOOTH signal, convert a received analog signal into a digital signal, and parse out the BLUETOOTH packet.

The receiving buffer is configured to temporarily store the BLUETOOTH packet received by the receiving module, and transfer data in the buffer to the BLUETOOTH host using the HCI interface. The receiving buffer may be cleared at any time. Once the buffer is fully filled with data, data that first enters the receiving buffer overflows.

The HCI is an interface defined between the BLUETOOTH host and BLUETOOTH controller for mutual communication. The BLUETOOTH host and the BLUETOOTH controller may be two discrete chips or components, or may be integrated into one chip, and the two modules are connected by an internal interface. For a manner of transmitting data using the HCI, two manners are defined in the BLUETOOTH specification: One is using a universal asynchronous receiver/transmitter (UART) bus for transmission. The other is using a USB for transmission.

The power supply is configured to supply power to different components of the electronic device to maintain their operations. Generally, the power supply may be a built-in battery, for example, a common lithium-ion battery or a nickel-hydride battery, or may include an external power supply that directly supplies power to the electronic device, for example, an alternating current (AC) adapter. In some implementation manners of the present disclosure, the power supply may be defined in a wider scope, for example, may include a power management system, a charging system, a power fault detection circuit, a power converter or inverter, a power status indicator (for example, a light emitting diode), and any other component related to power generation, management, and distribution of the electronic device.

Using the BLUETOOTH device as an example, the first obtaining module 101 may correspond to the BLUETOOTH host in the BLUETOOTH device, or multiple physical devices in the BLUETOOTH device, such as the processor, the BLUETOOTH host, and the sensor. The first determining module 102, the write module 103, and the encapsulation module 104 may correspond to the BLUETOOTH controller in the BLUETOOTH device, and the sending module 105 may correspond to the sending module in the BLUETOOTH controller.

In an example, the BLUETOOTH host module generates a service data packet, where the service data packet includes information such as a service type, a service identifier (ID), a priority, and service data (for example, data information such as heart rate data, blood-pressure data, time information, device information, a short messaging service message, an E-mail, and an instant messaging message), and transfers the service data packet to the BLUETOOTH controller module using the HCI. After receiving the service data packet, the BLUETOOTH controller module determines, according to the priority in the service data packet, whether the service data packet is a data packet to be urgently sent. If the service data packet is a data packet to be urgently sent, the service data packet is directly encapsulated into a packet and sent to the peer device, or it is detected whether data has been stored in the buffer, and if data has been stored in the buffer, the service data packet is written to the buffer, and encapsulated together with a service data packet of another service that has been stored in the buffer into a packet and sent to the peer device. If the service data packet is not a data packet to be urgently sent, the service data packet is written to the buffer in the BLUETOOTH controller module, and when an amount of data in the buffer meets a transmission condition, the data in the buffer is encapsulated into a packet and sent to the peer device.

In another example, the BLUETOOTH host module generates a service data packet, where the service data packet includes information such as a service type, a service ID, and service data (data information such as heart rate data, blood-pressure data, time information, device information, a short messaging service message, an E-mail, and an instant messaging message), and optionally includes a service priority. The BLUETOOTH host module knows the priority of the service data packet. If considering that the service data packet is a data packet to be urgently sent, the BLUETOOTH host module directly transmits the service data packet to the BLUETOOTH controller module using the HCI, and the service data packet is encapsulated into a packet in the BLUETOOTH controller module and sent to the peer device. If considering that the service data packet is not a data packet to be urgently sent, the BLUETOOTH host module first buffers the service data packet in the buffer of the BLUETOOTH host module, and when an amount of data in the buffer meets a transmission condition, transmits the data in the buffer to the BLUETOOTH controller module using the HCI, and the data is encapsulated into a packet in the BLUETOOTH controller module and sent to the peer device.

In an implementation manner of this embodiment of the present disclosure, the transmission condition includes data that has been stored in the packet buffer reaches or exceeds a threshold, where the threshold is set according to a maximum payload length that can be carried by the to-be-sent packet, or a preset length of time elapses after the first service data packet is written to the packet buffer, where the preset length of time is set according to a maximum transmission latency allowed by the service data packet.

According to a first aspect, in another implementation manner, the encapsulation module 104 is further configured to encapsulate the service data packet in order to generate a to-be-sent packet if the priority is higher than or equal to the preset level, where the sending module 105 is further configured to send the to-be-sent packet to the peer device.

According to a second aspect, in another implementation manner, the device may further include the detection module 201 configured to detect whether there is data stored in the packet buffer if the priority is higher than or equal to the preset level, where the encapsulation module 104 is further configured to write the service data packet to the packet buffer, and encapsulate data stored in the packet buffer in order to generate a to-be-sent packet if data has been stored in the packet buffer, and the sending module 105 is further configured to send the to-be-sent packet to the peer device.

In another implementation manner, the device further includes the second obtaining module 202 configured to obtain a length of the service data packet, and the second determining module 203 configured to determine, according to the length of the service data packet and a maximum payload length that can be carried by a to-be-sent packet, whether the service data packet can be written to the packet buffer, and the write module 103 is further configured to write the service data packet to the packet buffer when the service data packet can be written to the packet buffer.

In another implementation manner, the second determining module 203 is further configured to compare the length of the service data packet with a data amount of idle space of the packet buffer when the maximum payload length that can be carried by a to-be-sent packet is greater than a maximum data buffering amount of the packet buffer, determine that the service data packet can be written to the packet buffer if the length of the service data packet is less than or equal to the data amount of the idle space of the packet buffer, and determine that the service data packet cannot be written to the packet buffer if the length of the service data packet is greater than the data amount of the idle space of the packet buffer.

In another implementation manner, the second determining module 203 is further configured to calculate a sum of the length of the service data packet and an amount already occupied by data in the packet buffer when the maximum payload length that can be carried by a to-be-sent packet is less than or equal to a maximum data buffering amount of the packet buffer, determine that the service data packet can be written to the packet buffer if a calculation result is less than or equal to the maximum payload length that can be carried by a to-be-sent packet, and determine that the service data packet cannot be written to the packet buffer if a calculation result is greater than the maximum payload length that can be carried by a to-be-sent packet.

In another implementation manner, the write module 103 is further configured to write a preset separator at the end or beginning of the service data packet after writing the service data packet to the packet buffer.

In another implementation manner, the device further includes the clearing module 204 configured to clear the packet buffer.

In another implementation manner, the first obtaining module 101 is further configured to obtain, using a sensor, sensor data that needs to be sent to the peer device, and convert the sensor data into a service data packet in a particular format, where the particular format is a data structure that can be identified by the peer device.

In another implementation manner, the first obtaining module 101 is further configured to obtain, using a processor, service information that needs to be sent to the peer device, and convert the service information into a service data packet in a particular format, where the particular format is a data structure that can be identified by the peer device.

In another implementation manner, the first determining module 102 is further configured to determine a target service corresponding to the service data packet, and determine, according to a correspondence between a service type and a priority, a priority of the target service as the priority corresponding to the service data packet.

In another implementation manner, the device may further include the update module 205 configured to receive a priority control instruction sent by the peer device, where the priority control instruction carries service identification information and a priority, and update the correspondence between a service type and a priority according to the service identification information and the priority, and/or receive status information sent by the peer device, and update the correspondence between a service type and a priority according to the status information.

In the device described in this embodiment of the present disclosure, when a service data packet that needs to be sent to a peer device is obtained, a priority corresponding to the service data packet is determined, if the priority is lower than a preset level, the to-be-sent service data packet is written to a packet buffer, when data stored in the packet buffer meets a transmission condition, the data stored in the packet buffer is encapsulated in order to generate a to-be-sent packet, and the generated to-be-sent packet is sent to the peer device. By means of this embodiment of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

Figure 9:
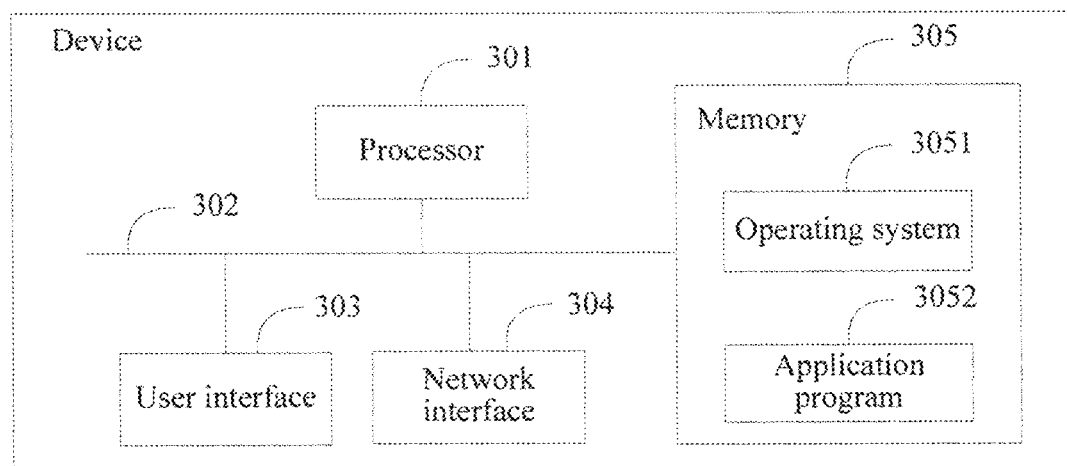
FIG. 9 is still another schematic structural diagram of a device according to an embodiment of the present disclosure.

Referring to FIG. 9, FIG. 9 is still another schematic structural diagram of a device according to an embodiment of the present disclosure. The device is configured to execute the data transmission method disclosed in the foregoing embodiment of the present disclosure, and may include at least a processor 301 and a memory 305. During specific implementation, the device may further include at least one network interface 304 or a user interface 303 and at least one communications bus 302, where the processor 301 may be a CPU, a micro controller, or the like, and the communications bus 302 is configured to implement connection and communication between the components. The user interface 303 may optionally include a USB interface and another standard interface and wired interface. The network interface 304 may optionally include a WI-FI interface, a BLUETOOTH interface, or another wireless interface. The memory 305 may include a high-speed random access memory (RAM), and may also further include a non-volatile memory, for example, at least one magnetic disk storage. The memory 305 may optionally include at least one storage apparatus far away from the processor 301. As shown in FIG. 9, as a computer storage medium, the memory 305 may include an operating system 3051 and an application program 3052.

In some implementation manners, the memory 305 stores the following components, an executable module or a data structure, or a subset thereof, or an extension set thereof. The operating system 3051, including various system programs and configured to implement various basic services and process a hardware-based task, and the application program 3052, including application programs such as a setting program of a data segmentation parameter of target network data, a division program of a target data block, a program of comparison between the target data block and a data block in a database, and a deletion program of the target data block, and configured to implement application services.

The memory 305 stores a set of program code, and the processor 301 is configured to invoke the program code stored in the memory 305 to execute the operations of obtaining a service data packet that needs to be sent to a peer device and determining a priority corresponding to the service data packet, writing the service data packet to a packet buffer if the priority is lower than a preset level, encapsulating the data stored in the packet buffer, to generate a to-be-sent packet when data stored in the packet buffer meets a transmission condition, and sending the to-be-sent packet to the peer device.

In an implementation manner, the transmission condition includes data that has been stored in the packet buffer reaches or exceeds a threshold, where the threshold is set according to a maximum payload length that can be carried by the to-be-sent packet, or a preset length of time elapses after the first service data packet is written to the packet buffer, where the preset length of time is set according to a maximum transmission latency allowed by the service data packet.

In an implementation manner, the processor 301 may further execute the following operations of encapsulating the service data packet in order to generate a to-be-sent packet if the priority is higher than or equal to the preset level, and sending the to-be-sent packet to the peer device, or detecting whether there is data stored in the packet buffer if the priority is higher than or equal to the preset level, writing the service data packet to the packet buffer, and encapsulating data stored in the packet buffer, to generate a to-be-sent packet if data has been stored in the packet buffer, and sending the to-be-sent packet to the peer device.

In an implementation manner, before the processor 301 executes the operation of writing the service data packet to a packet buffer, the processor 301 may further execute the operations of obtaining a length of the service data packet, and determining, according to the length of the service data packet and a maximum payload length that can be carried by a to-be-sent packet, whether the service data packet can be written to the packet buffer, and writing the service data packet to a packet buffer includes writing the service data packet to the packet buffer when determining that the service data packet can be written to the packet buffer.

In an implementation manner, executing, by the processor 301, the operation of determining, according to the length of the service data packet and a maximum payload length that can be carried by a to-be-sent packet, whether the service data packet can be written to the packet buffer may include executing the operations of comparing the length of the service data packet with a data amount of idle space of the packet buffer when the maximum payload length that can be carried by a to-be-sent packet is greater than a maximum data buffering amount of the packet buffer, and determining that the service data packet can be written to the packet buffer if the length of the service data packet is less than or equal to the data amount of the idle space of the packet buffer, or determining that the service data packet cannot be written to the packet buffer if the length of the service data packet is greater than the data amount of the idle space of the packet buffer.

In an implementation manner, executing, by the processor 301, the operation of determining, according to the length of the service data packet and a maximum payload length that can be carried by a to-be-sent packet, whether the service data packet can be written to the packet buffer may include executing the operations of calculating a sum of the length of the service data packet and an amount already occupied by data in the packet buffer when the maximum payload length that can be carried by a to-be-sent packet is less than or equal to a maximum data buffering amount of the packet buffer, and determining that the service data packet can be written to the packet buffer if a calculation result is less than or equal to the maximum payload length that can be carried by a to-be-sent packet, or determining that the service data packet cannot be written to the packet buffer if a calculation result is greater than the maximum payload length that can be carried by a to-be-sent packet.

In an implementation manner, after the processor 301 executes the operation of writing the service data packet to a packet buffer, the processor 301 may further execute the following operation of writing a preset separator at the end or beginning of the service data packet.

In an implementation manner, after the processor 301 executes the operation of sending the to-be-sent packet to the peer device, the processor 301 may further execute the following operation of clearing the packet buffer.

In an implementation manner, executing, by the processor 301, the operation of obtaining a service data packet that needs to be sent to a peer device may further include executing the operations of obtaining, using a sensor, sensor data that needs to be sent to the peer device, and converting the sensor data into a service data packet in a particular format, where the particular format is a data structure that can be identified by the peer device.

In an implementation manner, executing, by the processor 301, the operation of obtaining a service data packet that needs to be sent to a peer device may include executing the operations of obtaining, using the processor 301, service information that needs to be sent to the peer device, and converting the service information into a service data packet in a particular format, where the particular format is a data structure that can be identified by the peer device.

In an implementation manner, executing, by the processor 301, the operation of determining a priority corresponding to the service data packet may include executing the operations of determining a target service corresponding to the service data packet, and determining, according to a correspondence between a service type and a priority, a priority of the target service as the priority corresponding to the service data packet.

In an implementation manner, the processor 301 may further execute the operations of receiving a priority control instruction sent by the peer device, where the priority control instruction carries service identification information and a priority, and updating the correspondence between a service type and a priority according to the service identification information and the priority, and/or receiving status information sent by the peer device, and updating the correspondence between a service type and a priority according to the status information.

In the technical solution described in this embodiment of the present disclosure, a priority corresponding to a service data packet is determined when the service data packet that needs to be sent to a peer device is obtained. the to-be-sent service data packet is written to a packet buffer if the priority is lower than a preset level. Data stored in the packet buffer is encapsulated in order to generate a to-be-sent packet when the data stored in the packet buffer meets a transmission condition, and the generated to-be-sent packet is sent to the peer device. By means of this embodiment of the present disclosure, a manner of sending a to-be-sent service data packet is determined according to a priority corresponding to the service data packet, and if the priority is relatively low, a payload in a to-be-sent packet is made close to a maximum payload length of the to-be-sent packet as far as possible, thereby improving data transmission efficiency and reducing power consumption of transmission.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present disclosure. In this specification, exemplary descriptions of the foregoing terms are not necessarily directed at a same embodiment or example. In addition, the described specific feature, structure, material, or characteristic may be combined in an appropriate manner in any one or more embodiments or examples. In addition, without causing any mutual contradiction, a person skilled in the art may integrate and combine different embodiments or examples described in this specification and features of the different embodiments or examples.

A person skilled in the art may integrate and combine different embodiments described in this specification and features of the different embodiments. Modules or units in all of the embodiments of the present disclosure may be implemented using an integrated circuit, for example, a CPU or an application specific integrated circuit (ASIC).

Steps in all of the embodiments of the present disclosure may be adjusted in terms of an order, combined, and deleted according to an actual requirement, and module or units in all of the embodiments of the present disclosure may be combined, divided, or deleted according to an actual requirement.

Any process or method in the flowcharts or described herein in another manner may be understood as indicating a module, a segment, or a part including code of one or more executable instructions for implementing a particular logical function or process step. In addition, the scope of preferred embodiments of the present disclosure include other implementations which do not follow the order shown or discussed, including performing, according to involved functions, the functions basically simultaneously or in a reverse order, which should be understood by technical personnel in the technical field to which the embodiments of the present disclosure belong.

The logic and/or steps shown in the flowcharts or described in any other manner herein, for example, a sequenced list that may be considered as executable instructions used for implementing logical functions, may be implemented in any computer readable medium to be used by an instruction execution system, apparatus or device (for example, a computer-based system, a system including a processor, or another system that can obtain an instruction from the instruction execution system, apparatus or device and execute the instruction) or to be used by combining such instruction execution systems, apparatuses or devices. In this specification, the "computer readable medium" may be any apparatus that may include, store, communicate, spread or transmit a program to be used by an instruction execution system, apparatus or device or to be used by combining such instruction execution systems, apparatuses or devices. A more specific example (a non-exhaustive list) of the computer readable medium includes the following an electrical connecting portion (an electrical apparatus) having one or more wires, a portable computer cartridge (a magnetic apparatus), a RAM, a read-only memory (ROM), an erasable programmable read-only memory (EPROM or flash memory), an optical fiber apparatus, and a portable compact disc read-only memory (CDROM). In addition, the computer readable medium may even be paper or another suitable medium on which the program can be printed, as the program can be electronically obtained by, for instance, optical scanning of the paper or another medium, then compiled, interpreted, or otherwise processed in a suitable manner if necessary, and then stored in a computer memory.

A person of ordinary skill in the art may understand that all or part of the steps of the method of the embodiments may be implemented by a program instructing relevant hardware. The program may be stored in a computer readable storage medium. When the program is executed, one or a combination of the steps of the method embodiments is performed.

In addition, functional units in the embodiments of the present disclosure may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

The aforementioned storage medium may be a read-only memory, a magnetic disk, or an optical disc. Although the embodiments of the present disclosure have been shown and described above, it may be understood that the embodiments are exemplary and cannot be construed as a limitation to the present disclosure, and a person of ordinary skill in the art can make changes, modifications, replacements, and variations to the embodiments without departing from the scope of the present disclosure.

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A data transmission method, comprising:
obtaining a service data packet that needs to be sent to a peer device, the service data packet being associated with a service;
determining a priority of the service data packet according to a preset priority of the service;
encapsulating the service data packet without writing the service data packet to a packet buffer when the priority of the service associated with the service data packet is higher than or equal to a preset level;
generating a to-be-sent packet from the encapsulated service data packet when the priority of the service associated with the service data packet is higher than or equal to the preset level;
writing the service data packet to the packet buffer when the priority of the service data packet is lower than the preset level;
encapsulating data stored in the packet buffer to generate the to-be-sent packet when the data stored in the packet buffer meets a transmission condition; and
sending the to-be-sent packet to the peer device.

2. The data transmission method of claim 1, wherein the transmission condition comprises either:
the data stored in the packet buffer meets or exceeds a data threshold, the data threshold being a maximum payload length of the to-be-sent packet; or
a preset length of time has elapsed after a first service data packet is written to the packet buffer, the preset length of time being defined according to a maximum transmission latency allowed by the service data packet.

3. The data transmission method of claim 1, further comprising:
detecting whether the data is stored in the packet buffer when the priority of the service is higher than or equal to the preset level;
writing the service data packet to the packet buffer and storing the data in the packet buffer;
encapsulating the data stored in the packet buffer to generate the to-be-sent packet and storing the data in the packet buffer; and
sending the to-be-sent packet to the peer device.

4. The data transmission method of claim 1, wherein before writing the service data packet to the packet buffer, the method further comprises:
obtaining a length of the service data packet; and
determining, according to the length of the service data packet and a maximum payload length of the to-be-sent packet, whether the service data packet can be written to the packet buffer; and
writing the service data packet to the packet buffer comprises writing the service data packet to the packet buffer when the service data packet can be written to the packet buffer.

5. The data transmission method of claim 4, wherein determining whether the service data packet can be written to the packet buffer comprises:
comparing a first length of the service data packet with a second length of a data amount of an idle storage space of the packet buffer, the maximum payload length of the to-be-sent packet being greater than a maximum data buffering amount of the packet buffer;
determining that the service data packet can be written to the packet buffer when the length of the service data packet is less than or equal to a data amount of the idle storage space of the packet buffer; and
determining that the service data packet cannot be written to the packet buffer when the length of the service data packet is greater than the data amount of the idle storage space of the packet buffer.

6. The data transmission method of claim 4, wherein determining whether the service data packet can be written to the packet buffer comprises:
calculating a sum of the length of the service data packet and an amount occupied by the data stored in the packet buffer, the maximum payload length of the to-be-sent packet being less than or equal to a maximum data buffering amount of the packet buffer;
determining that the service data packet can be written to the packet buffer, the sum of the length of the service data packet being less than or equal to the maximum payload length of the to-be-sent packet; and
determining that the service data packet cannot be written to the packet buffer, the sum of the length of the service data packet being greater than the maximum payload length of the to-be-sent packet.

7. The data transmission method of claim 1, further comprising writing a preset separator at an end or a beginning of the service data packet after writing the service data packet to the packet buffer.

8. The method of claim 1, further comprising clearing the packet buffer after sending the to-be-sent packet to the peer device.

9. The data transmission method of claim 1, wherein obtaining the service data packet that is to be sent to the peer device comprises:
obtaining sensor data that needs to be sent to the peer device; and
converting the sensor data into the service data packet in a particular format, the particular format comprising a data structure that can be identified by the peer device.

10. The data transmission method of claim 1, wherein obtaining the service data packet that is to be sent to the peer device comprises:
obtaining service information that needs to be sent to the peer device; and
converting the service information into the service data packet in a particular format, the particular format comprising a data structure that can be identified by the peer device.

11. A device, comprising:
a memory comprising instructions; and
a processor coupled to the memory and configured to execute the instructions, the instructions causing the processor to be configured to:
obtain a service data packet that needs to be sent to a peer device, the service data packet being associated with a service;
determine a priority of the service data packet according to a preset priority of the service;
encapsulate the service data packet without writing the service data packet to a packet buffer when the priority of the service associated with the service data packet is higher than or equal to a preset level;
generate a to-be-sent packet from the encapsulated service data packet when the priority of the service associated with the service data packet is higher than or equal to the preset level;
write the service data packet to the packet buffer when the priority of the service data packet is lower than the preset level;

encapsulate data stored in the packet buffer in order to generate the to-be-sent packet when the data stored in the packet buffer meets a transmission condition; and send the to-be-sent packet to the peer device.

12. The device of claim 11, wherein the transmission condition comprises either:

the data stored in the packet buffer meets or exceeds a data threshold, the data threshold being a maximum payload length of the to-be-sent packet; or a preset length of time has elapsed after a first service data packet is written to the packet buffer, the preset length of time being defined according to a maximum transmission latency allowed by the service data packet.

13. The device of claim 11, wherein the instructions further cause the processor to be configured to:

detect whether the data is stored in the packet buffer, the priority of the service being higher than or equal to the preset level;

write the service data packet to the packet buffer;

encapsulate the data stored in the packet buffer in order to generate the to-be-sent packet and store the data in the packet buffer; and send the to-be-sent packet to the peer device.

14. The device of claim 11, wherein before writing the service data packet to the packet buffer, the instructions further cause the processor to be configured to:

obtain a length of the service data packet;

determine, according to the length of the service data packet and a maximum payload length of the to-be-sent packet, whether the service data packet can be written to the packet buffer; and write the service data packet to the packet buffer when the service data packet can be written to the packet buffer.

15. The device of claim 14, wherein when determining whether the service data packet can be written to the packet buffer, the instructions further cause the processor to be configured to:

compare a first length of the service data packet with a second length of a data amount of an idle storage space of the packet buffer, the maximum payload length of the to-be-sent packet being greater than a maximum data buffering amount of the packet buffer;

determine that the service data packet can be written to the packet buffer, the length of the service data packet being less than or equal to a data amount of the idle storage space of the packet buffer; and determine that the service data packet cannot be written to the packet buffer, the length of the service data packet being greater than the data amount of the idle storage space of the packet buffer.

16. The device of claim 14, wherein when determining whether the service data packet can be written to the packet buffer, the instructions further cause the processor to be configured to:

calculate a sum of the length of the service data packet and an amount occupied by the data stored in the packet buffer, the maximum payload length of the to-be-sent packet being less than or equal to a maximum data buffering amount of the packet buffer;

determine that the service data packet can be written to the packet buffer, the sum of the length of the service data packet being less than or equal to the maximum payload length of the to-be-sent packet; and determine that the service data packet cannot be written to the packet buffer, the sum of the length of the service data packet being greater than the maximum payload length of the to-be-sent packet.

17. The device of claim 11, wherein the instructions further cause the processor to be configured to write a preset separator at an end or a beginning of the service data packet after writing the service data packet to the packet buffer.

18. The device of claim 11, wherein the instructions further cause the processor to be configured to clear the packet buffer after sending the to-be-sent packet to the peer device.

19. The device of claim 11, further comprising a sensor coupled to the processor, and when obtaining the service data packet that is to be sent to the peer device, the instructions further cause the processor to be configured to:

obtain, using the sensor, sensor data that is to be sent to the peer device; and convert the sensor data into the service data packet in a particular format, the particular format comprising a data structure that can be identified by the peer device.

20. The device of claim 11, wherein when obtaining the service data packet that is to be sent to the peer device, the instructions further cause the processor to be configured to:

obtain service information that needs to be sent to the peer device; and convert the service information into the service data packet in a particular format, the particular format comprising a data structure that can be identified by the peer device.

* * * * *